US009458399B2

(12) United States Patent
Wei et al.

(10) Patent No.: US 9,458,399 B2
(45) Date of Patent: Oct. 4, 2016

(54) ASSOCIATIVE POLYMERS FOR MIST-CONTROL

(75) Inventors: Ming-Hsin Wei, Pasadena, CA (US); Julia A. Kornfield, Pasadena, CA (US); Ralph Leonard Ameri David, Flower Mound, TX (US)

(73) Assignee: CALIFORNIA INSTITUTE OF TECHNOLOGY, Pasadena, CA (US)

( * ) Notice: Subject to any disclaimer, the term of this patent is extended or adjusted under 35 U.S.C. 154(b) by 444 days.

(21) Appl. No.: 12/763,144

(22) Filed: Apr. 19, 2010

(65) Prior Publication Data

US 2010/0287822 A1 Nov. 18, 2010

Related U.S. Application Data

(60) Provisional application No. 61/170,271, filed on Apr. 17, 2009.

(51) Int. Cl.

*C08L 53/00* (2006.01)
*C08L 39/00* (2006.01)
*C08L 39/04* (2006.01)
*C08L 33/02* (2006.01)
*C10L 1/14* (2006.01)
*C08G 83/00* (2006.01)
*C10L 10/00* (2006.01)
*C10L 1/196* (2006.01)
*C10L 1/236* (2006.01)

(52) U.S. Cl.

CPC ............. *C10L 1/146* (2013.01); *C08G 83/008* (2013.01); *C10L 10/00* (2013.01); *C10L 1/1963* (2013.01); *C10L 1/2366* (2013.01)

(58) Field of Classification Search

CPC .................................................... C08G 83/008
USPC ............ 525/89, 191, 203, 217, 219; 44/300, 44/329, 333, 335, 340, 346, 387, 404
See application file for complete search history.

(56) References Cited

U.S. PATENT DOCUMENTS

| | | | | |
|---|---|---|---|---|
| 2,848,442 | A | 8/1958 | Svetlik, Sr. | |
| 4,396,398 | A | 8/1983 | Knight | |
| 4,516,982 | A | 5/1985 | Duvdevan et al. | |
| 4,731,096 | A | 3/1988 | Hamil et al. | |
| 4,770,814 | A | 9/1988 | Rose et al. | |
| 6,475,408 | B1 | 11/2002 | Denis et al. | |
| 6,797,805 | B2 | 9/2004 | Okazaki et al. | |
| 7,262,257 | B2 | 8/2007 | Chung et al. | |
| 2006/0140898 | A1* | 6/2006 | Dubief et al. | 424/70.13 |
| 2007/0287762 | A1 | 12/2007 | Casati et al. | |

FOREIGN PATENT DOCUMENTS

WO 2010121270 A1 10/2010

OTHER PUBLICATIONS

Gailard et al., Progress in Organic Coatings 57, 98-109 (2006).*
Binder et al., Supramolecular Poly(ether ketone)-Polyisobutylene Pseudo-Block Copolymers, Journal of Polymer Science: Part A: Polymer Chemistry, vol. 42, 162-172 (2004).*
Abed, S et al., "Supramolecular association of acid terminated polydimethylsiloxanes 3. Viscosimetric study", Polymer, Elsevier Science Publishers B.V, GB, vol. 42, No. 21, Oct. 1, 2001, 8613-8619.
Chao et al., "Antimisting Action of Polymeric Additives in Jet Fuels", AIChE Journal, Jan. 1984, vol. 30, No. 1, pp. 111-120.
Ergungor et al., "Atomization and elongational viscosity of associating triblock copolymer solutions", J. Non-Newtonian Fluid Mech. 2001, vol. 97, pp. 159-167.
Goldstein, "Model of phase equillibria in micellar solutions of nonionic surfactants", J. Chem. Phys. Mar. 15, 1986, vol. 84, No. 6, pp. 3367-3378.
Lumley, "Drag Reduction by Additives", Annu. Rev. Fluid Mech., 1969, vol. 1, pp. 367-387.
Wright et al., "Assessment of concepts and Research for Commercial-Aviation Fire-Safe Fuel", SWRI, Jan. 2000, 14 pgs.
David, R., "Associative Polymers as Antimisting Agents and Other Functional Materials via Thiol-Ene Coupling", Thesis, Mar. 7, 2008, 189 pgs.
David, R. et al., "Effects of Pairwise, Donor-Acceptor Functional Groups on Polymer Solubility, Solution Viscosity and Mist Control", Polymer, Nov. 11, 2009, vol. 50, pp. 6323-6330.
David, R. et al., "Effects of Pairwise, Self-Associating Functional Side Groups on Polymer Solubility, Solution Viscosity, and Mist Control", Macromolecules, Feb. 3, 2009, vol. 42, pp. 1380-1391.
International Search Report and Written Opinion for International Application No. PCT/US2010/031654, Search completed Jun. 8, 2010, Mailed Jun. 23, 2010, 6 Pgs.
Supplemental European Search Report for Application No. EP 10765351, Search completed Dec. 7, 2012, 11 Pgs.
"Fuel Safety Research," Workshop Proceedings, FAA, Oct. 29-Nov. 1, 1985, Alexandria, Virginia.
Sarohia, Virendra et al., "Research on Antimisting Fuel for Suppression of Post-Crash Fires," AIA paper 86-0573.
Gry, A. et al., "Drag Reduction of Turbulent Flows by Additives," Kluwer (1995).
Yaffee, M., DOT/FAA/CT-86/7, Apr. 1986.
NCR Proceedings, NMAB-490, Washington DC, 1997.
Binder, W. H. et al., "Macromolecules," 2004, 37, (5), pp. 1749-1759.

(Continued)

*Primary Examiner* — Jeffrey Mullis
(74) *Attorney, Agent, or Firm* — Lathrop & Gage LLP

(57) ABSTRACT

Polymeric mist control materials, methods of forming polymeric mist control materials, and methods of using such materials for mist control are provided. The polymeric mist control additives are formed of molecules comprised predominantly of monomers that confer high solubility in fuel and include associative groups that attract each other in donor-acceptor manner, and are incorporated such that multiple associative groups are in close proximity ("clusters"), such that the clusters are separated by very long non-associative sequences.

17 Claims, 15 Drawing Sheets

(56) References Cited

OTHER PUBLICATIONS

Hill, T. L., "An introduction to Statistical Thermodynamics," Dover Productions: 1986, pp. 402-404.
Kolomiets, E. et al., "Macromolecules," 2006, 39, (3), pp. 1173-1181.
Lint, J.H. et al., "A Course in Combinatorics," Cambridge University Press: 2001, pp. 522-525.
Rubinstein, M. et al., "Polymer Physics," Oxford: 2003, pp. 176, Equation 5.19.
Rubinstein, M. et al., "Polymer Physics," Oxford: 2003, pp. 53, Table 2.1.

* cited by examiner a)
association
b)
association
c)
functionalization
OR

A∼A + 2 B∼C + 2 D∼ ⟶ ∼DC∼BA∼AB∼CD∼ a)
m
n
m
S
N
b)
n
m
S
$NO_2$
$NO_2$
c)
m
n
p
OR
OH
S
N

ASSOCIATIVE POLYMERS FOR MIST-CONTROL

CROSS-REFERENCE TO RELATED APPLICATIONS

This application claims priority to U.S. Provisional Application No. 61/170,271, filed Apr. 17, 2009, the disclosure of which is incorporated herein by reference.

FIELD OF THE INVENTION

This invention relates generally to polymeric additives to suppress misting, more particularly to polymeric fuel additives that confer high solubility in fuel and include associative groups that attract each other in donor-acceptor manner, to methods of making such materials, and methods of suppressing misting using such materials.

BACKGROUND OF THE INVENTION

The problem of fuel fires is ubiquitous for vehicles ranging from automobiles to jumbo jets and for fuel handling operations, particularly dispensing. In the field of civil aviation, over the last four decades, on average two air carrier accidents have occurred monthly within the US and fifteen worldwide. This level persists despite ongoing efforts to eliminate human error and improve security. Of these, an estimated 70% occur on takeoff or landing and are impact-survivable. It is further estimated that 40% of the fatalities in such crashes are due to fire caused by combustion of aviation fuel. Thus, it is estimated that some 500 to 1000 lives per year can be saved by the development of an effective mist control fuel system.

Perhaps more important is the issue of homeland security. The destructive power of a fully-fueled aircraft comes from the fuel—not kinetic energy. For example, in the case of the Sep. 11, 2001 attack on the World Trade Centers, both towers absorbed the aircraft's momentum and survived the initial impact. Threats to high-rise buildings, sports arenas, nuclear power facilities, and other important targets result from the explosion and intense post-crash fire. Thus, the successful incorporation of a mist control fuel additive would greatly reduce the property loss caused by plane accidents, and may serve to deter terrorists from using passenger aircraft fuel as a weapon of mass destruction.

Presently, there are no implemented technologies to reduce the fire hazard of fuel in crash scenarios. The associated safety and security issues are merely accepted as risks incident to air transportation. Attempts in the past to mitigate aircraft crash fires have led to the incorporation of firewalls, flame arresters, fuel-line isolation, fire extinguishing systems, fire-resistant materials, etc. with limited success. A 1997 NRC report points to this problem specifically, stating, "the reduction of the fire hazard of the fuel itself is critical in improving survivability in past crashes." (See, e.g., NCR Proceedings, NMAB-490, Washington D.C., 1997, the disclosure of which is incorporated herein by reference.) Candidate technologies aimed to provide a post-impact fire-safe fuel were evaluated in the January 2000 report of Southwest Research Institute, prepared by Bernard Wright under contract to NASA. (See, e.g., "Assessment of Concepts and Research for Commercial Aviation Fire-Safe Fuel," Bernard Wright, SWRI, January 2000, the disclosure of which is incorporated herein by reference.) Based on an extensive review of fuel vulnerability studies and discussions with industry-knowledgeable sources, Mr. Wright concluded that Mist-Controlled Kerosene (MCK) technology was rated as the most promising and highest priority to date.

MCK is a conventional Jet-A fuel to which a small fraction of high MW polymer (<0.3 wt %) has been added. When fuel is released from ruptured tanks into the airflow around a crashing aircraft, the polymer interferes mechanically with the formation of mist. Linear polymer chains that have high enough MWs are well known to be effective mist-control agents (i.e. of MW>~5,000,000 g/mol, abbreviated as 5M g/mol). Unfortunately, ultralong homopolymers degrade upon passage through pumps, filters or long pipelines (termed "shear degradation"), rendering them ineffective for mist suppression. Attempts to create polymers that suppress misting and resist flow degradation have been made, primarily by adding randomly placed associating groups onto fuel-soluble polymers. Among the large number of associating polymers synthesized in an attempt to achieve mist-control the one that advanced the farthest technologically was "FM-9", a proprietary polymer developed by the British company Imperial Chemical Industries (ICI) in the 1970's. The last major attempt at polymer-modified fuel was the FAA-funded anti-misting kerosene (AMK) program centered on FM-9, shown in FIG. 1*a*. By trial and error a fuel formulation was produced that reduced the post-crash fire; however, ultimately the program failed because the formulation could not be produced, transported and stored using existing fuel handling systems. It did not have adequate resistance to shear degradation, so it could not be pumped or filtered (therefore, the additive could not be incorporated at the point of production of the fuel or in any centralized facility). Efforts to add the polymers to the fuel at the point of delivery have proven impractical both economically and from a regulatory point of view. Furthermore, FM-9 tended to phase separate, particularly under cold conditions, so it could not be stored or used at low temperature (e.g., it would deposit on the walls of storage tanks and would clog fuel filters). The FM-9 polymers lost efficacy under hot conditions due to disruption of the attraction between associating groups.

Several groups have found experimentally that by placing associative groups randomly along polymer chains, the molecules could be made to 'stick' to each other in aggregates of approximately 10 to 100 chains. Therefore, aggregates greater than 5M g/mol can be achieved using polymers of MW 0.1M-1M g/mol that are small enough that they do not undergo shear degradation during fuel handling. Some experiments indicated that flow degradation could be reduced using randomly placed associative groups (because aggregates could pull apart during brief intervals of intense flow and reassemble again afterward.) Nevertheless, despite the extensive effort devoted to randomly functionalized associative polymers, no commercially viable mist control fuel has yet been produced. The polymers were not effective at the dilute conditions of most interest for fuel additives (for example, FM-9 was used at 0.3% wt, a much greater concentration than any other fuel additive). At dilute concentrations, the associating groups within a given polymer drive the polymer to collapse upon itself, rendering it ineffective for mist suppression. Furthermore, addition of associating groups to a fuel-soluble polymers tends to drastically reduce its solubility in fuel, leading to phase separation, which leads to unacceptable behavior during storage and use (noted above in relation to FM-9)

In an attempt to remedy the loss of multi-chain clusters at dilute concentrations, a few studies have examined "donor-acceptor" associative polymers that use two different polymers, one bearing randomly placed "donor" groups (that do not associate with each other) and the other polymer bearing randomly placed "acceptor" groups (that do not associate with each other). The driving force for association causes "donor chains" to associate with "acceptor chains", even under dilute conditions. Unfortunately, as will be fully developed below, all of these prior polymer design concepts aimed at reducing the fire hazard of fuel were misguided. Even supramolecules held together by association of randomly distributed donor and acceptor groups exhibit chain collapse under dilute conditions: the multi-chain aggregates are densely "stuck" to one another and occupy a much smaller volume than the unfunctionalized, separate chains would. Despite the high molar mass of the aggregate, they are less effective for mist suppression than the corresponding homopolymers (with no associative groups at all).

Accordingly, despite decades of effort, no polymer design has been discovered that can overcome shear degradation and avoid chain collapse, and thereby provide effective mist control. The current invention describes mist control polymers that have the following properties:

- Can be added at the refinery where other fuel additives e.g., anti-static agents, are introduced;
- Provides effective fire protection at low concentrations between 50-500 ppm;
- Withstands unintentional degradation during fuel handling;
- Does not deposit onto materials used in storage tanks, filters and transfer systems;
- Will be compatible with current aviation fuel handling and pumping systems; and
- May be synthesized at an acceptable cost.

BRIEF SUMMARY OF THE INVENTION

Thus, there is provided in accordance with the current invention a polymeric associative mist control material including a plurality of medium-soluble chains and a plurality of associative groups, wherein the associative groups attach in clusters at the ends of the medium-soluble chains such that these clusters of associative groups are separated by the medium-soluble chains.

In one embodiment, the polymers of the invention are telechelic and include a mixture of at least two different complementary polymers. In such an embodiment, each of the polymers includes one or more long, non-associative middle blocks selected to confer solubility to the polymer in a particular medium, and a plurality of associative groups disposed in small clusters that are separated by the long, fuel-soluble blocks. The different complementary polymers reversibly associate with an association strength less than that of a covalent bond to form supramolecules of sufficient size to prevent misting of the medium.

In another embodiment, each of the clusters comprises at least twenty associating groups. The associative groups are placed in clusters so that their overall strength of association can be increased to the strength required to remain effective to the highest temperature demanded by type of fuel and its use conditions. In another such embodiment, the clusters are formed using a mode selected from the group consisting of comonomers, dendrimers, nanoparticles and specially designed chemical units that confer polyvalent association. In all such embodiments, the associative groups on a particular polymer do not associate with themselves.

In still another embodiment of the invention, the complementary polymers have a molecular weight of from 100 to 1000 kg/mol.

In yet another embodiment of the invention, the middle chains confer high solubility in fuel over a wide temperature range −40° C. to +60° C. In such an embodiment, the solubility in fuel is conferred to the middle chains by hydrocarbon groups, such as alkanes and alkenes, in the polymer backbone and attached thereto.

In still yet another embodiment of the invention, the different complementary polymers form a donor/acceptor pair.

In still yet another embodiment, the associative groups are selected from the group of hydrogen bond donor/acceptor pairs, charge transfer donor/acceptor pairs and ionic bond donor/acceptor pairs. In one such embodiment, the associative groups include a carboxylic acid/tertiary amine acid/base pair. In such an embodiment, the tertiary amine side groups may be selected from the group consisting of dialkylamino groups connected via a linker that includes methylene carbons adjacent to the amine, such as (dimethylamino) alkyl groups, (diethylamino) alkyl groups, (methylethylamino)alkyl groups, pyridyl groups, etc. In another such embodiment, the associative groups include a hydrogen bond pair selected from the group consisting of hydroxyphenyl/pyridyl pairs and 2,4-Bis(propylamido)pyridine/Hydrouracil pair. In another such embodiment, the associative groups include a charge transfer pair. In such an embodiment, the electron donor is selected from the group consisting of carbazole derivatives and N,N-dimethylanilino derivatives, and the electron acceptor is selected from the group consisting of dinitrophenyl group; 3,6-dinitro-carbazolyl group; buckminsterfullerene ($C_{60}$); 4-bromo-1-naphthyl group, dansyl group, anthracene, pyrene, 2,3,5,6-tetrafluorophenyl group; and cyanophenyl group.

In still yet another embodiment, the fuel-soluble blocks are homopolymers or copolymers of different monomers. In one such embodiment, the fuel-soluble block is an unsaturated hydrocarbon. In such an embodiment, the monomers are selected from the group of isoprene, butadiene, ethylene, propylene, butene, norbornene derivatives, cyclobutene, cyclopentene, cyclooctene, cyclooctadiene, and trans,trans,cis-1,5,9-cyclododecatriene.

In still yet another embodiment, the association of the complementary polymers is sufficiently strong to provide self-assembly of the polymers into supramolecules at temperatures up to 60° C.

In still yet another embodiment, the mist control material comprises a mixture of two complementary polymers, where the associative groups of each of the complementary polymers is different such that each end of each of the complementary polymers is designed to associate with only one end of the other complementary polymer. In one such embodiment, the associative groups at the first end of both complementary polymers associate by an acid/base interaction, and the associative groups at the second end of both complementary polymers associate by an electron donor/acceptor interaction. In one preferred embodiment, the supramolecules are linear chains comprised of a defined number of complementary polymers. In one such embodiment, the complementary polymers controllably associate to form linear pentamer supramolecules.

In still yet another embodiment, the polymers are provided in a concentration of from 100 to 1000 ppm.

In still yet another embodiment, the invention is directed to a method of forming mist control materials, comprising synthesizing at least two different complementary telechelic polymers, combining the complementary polymers to form a mixture, and allowing the associative groups of the at least two different complementary polymers to reversibly associate with an association strength less than that of a covalent bond to form supramolecules of sufficient length to prevent misting of the medium. In one preferred embodiment, the supramolecules are linear molecules comprised of a defined number of complementary polymers.

In still yet another embodiment, the associative groups are formed by controlled radical polymerization. In another such embodiment, the controlled radical polymerization technique is chosen from the group consisting of atom-transfer radical polymerization and reversible addition-fragmentation chain transfer polymerization. In another such embodiment, the telechelic polymers are synthesized by ruthenium-catalyzed ring-open metathesis polymerization. In one such embodiment, the synthesis of the telechelic polymers is conducted in the presence of a custom chain transfer agent.

In still yet another embodiment, the mist control material is a mixture of associative polymers formed by condensation of medium-soluble chains and clusters of associative groups.

In still yet another embodiment, the invention is directed to a method of controlling mist in a medium comprising providing a mixture of associative polymers wherein the associative groups of the at least two different complementary polymers may reversibly associate with an association strength less than that of a covalent bond to form supramolecules designed to prevent misting of the medium at concentrations of from 50 to 500 ppm. In one such embodiment the associative polymers comprise a mixture of at least two different complementary telechelic polymers.

BRIEF DESCRIPTION OF THE DRAWINGS

The description will be more fully understood with reference to the following figures and data graphs, which are presented as exemplary embodiments of the invention and should not be construed as a complete recitation of the scope of the invention, wherein.

DETAILED DESCRIPTION OF THE INVENTION

Figure 1:
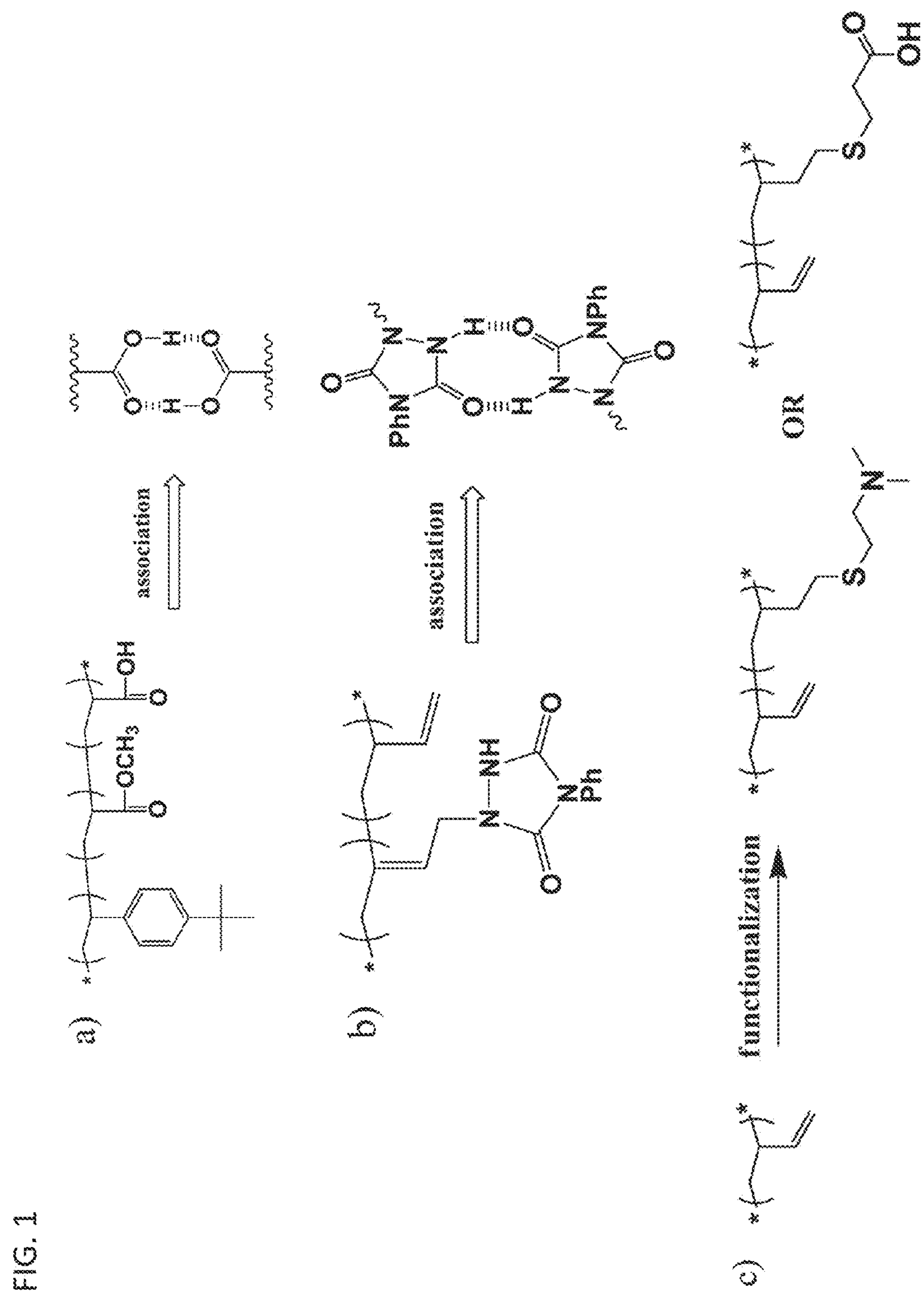
FIG. 1 provides schematics of conventional polymer chains bearing randomly distributed functional groups, including: (a) Self-associating FM-9 random copolymer, (b) self-associating triazolinedione-modified 1,2 PB, and (c) hydrogen bond donor/acceptor copolymer pair synthesized from 1,2 PB.

The present invention is directed to associative polymeric additives that can be used for mist control, methods of forming such mist control materials, and methods of suppressing misting using such materials. The polymeric mist control additives in accordance with the current invention are formed of complementary polymers comprised predominantly of monomers that confer high solubility in a medium of choice, such as, for example, fuel, and include associative groups that attract each other in donor-acceptor manner, and are incorporated such that multiple associative groups are in close proximity ("clusters") such that the clusters are separated by one or more nonassociative sequences. Exemplary modes of incorporating clusters of associative groups into the polymers of the invention include comonomers, dendrimers, nanoparticles and specially designed chemical units that confer polyvalent association. In the invention, donor~acceptor interactions may be chosen from a variety of complementary pairs, including, but not limited to, hydrogen bond donor/acceptor pairs, charge transfer donor/acceptor pairs and ionic bond donor/acceptor pairs.

The polymer structure of the invention fulfills essential requirements for mist control that are unprecedented, including, excellent shear tolerance, efficacy at very low concentration, solubility even at a user specified lower use temperature, the ability to tune association strength so that efficacy is retained to a user specified upper use temperature, etc. As a result, the current invention provides a novel class of polymeric mist control materials.

DEFINITIONS

Block: for the purposes of this invention, is used in the same sense as in the literature on block copolymers, meaning a consecutive sequence of repeat units of a given type (such as, fuel-soluble repeat units). (See, e.g., Ergungor, Z., *Journal of Non-Newtonian Fluid Mechanics,* 97 (2-3), Pp. 159-167 (2001), the disclosure of which is incorporated herein by reference.)

Long Block: for the purposes of this invention, refers to a sequence of 100 or more repeat units.

Cluster: for the purposes of this invention, is a collection of multiple associative groups in close proximity. Such clusters of associative groups may be incorporated into the polymers of the invention via a number of methods, including, for example, comonomers, dendrimers, nanoparticles and specially designed chemical units that confer polyvalent association.

Comparison with Conventional Mist Control

Mist-controlled kerosene (MCK), previously documented as anti-misting kerosene (AMK), is a conventional hydrocarbon fuel to which a small fraction of high molecular weight polymer has been added. (See, e.g., M. Yaffee, DOT/FAA/CT-86/7, April 1986, the disclosure of which is incorporated herein by reference.) When fuel is accidentally spilled, the polymer interferes mechanically with the formation of mist. Long chain molecules hold the fuel together in much larger drops and, thus, act as a mist-control agent. The total surface area available to vaporize is several orders of magnitude less for the mist-controlled fuel's large drops than the fine mist generated by the conventional fuel. This vast reduction in vapor and the increase in the thermal mass per drop combine to reduce the rate of energy release in the presence of transient ignition sources during tank rupture, which further reduces vaporization relative to untreated fuel. Any resulting fire is cooler, tends not to propagate away from the ignition source, self-quenches when the ignition source is removed, provides considerable cooling to exposed surfaces, and the likelihood of igniting pool fuel fires is either eliminated or significantly delayed. On the other hand, fine fuel mist burns uncontrolled if ignited and the resulting fire propagates away from the ignition source involves more fuel, and thus triggering deadly pool fires. Fuel mist triggered pool fires are known to be very violent and intense, often accompanying tank explosions, leaving no chance to intervene. Accordingly, mist-controlled fuel eliminates or significantly delays tank explosions, giving personnel time to move away from the site and giving firefighters critical time to contain and extinguish the fire.

The obstacle to implementation of MCK over the past thirty years has been the shear degradation of the high molecular weight polymers. Specifically, as the fuel is pumped during transportation and dispensing, the very long polymer shear degrades rapidly and loses its mist-control capability. The current invention presents a novel family of associative mist-control polymers, which overcome this long-standing shortcoming. However, prior to examining the associative mist control additives of the current invention, it is important to understand the deficiencies of past mist control polymers.

Past research has shown that the presence of ultra-high molecular polymer in fuel, e.g., JP-8, diesel fuel, Jet-A etc. suppresses misting and could provide the necessary fire suppression needed. Polyisobutylene (PIB) is an excellent example of such polymers additives. However, there are several operational issues with such polymers as mist-control additives (Table 1), such as unintentional shear degradation. Such polymer degradation, which will result in loss of fuel fire protection in operation, has to be overcome before one could fully realize its benefits as a mist-control additive. The inventive polymers associate into ultralong chains with non-covalent linkages that are weaker than a covalent bond and thereby, by design, overcome this limitation. During passage through pumps, for example, the non-covalent linkages disassemble, preventing covalent bond rupture. The inventive chains rapidly re-associate after passing through an intense flow to restore the supramolecular structures that provide mist control. While some associative polymers—including FM-9—have been examined over the past 30 years, no polymer has successfully met all of the criteria satisfied by the materials of the instant invention. Most of the prior efforts were devoted to polymers in which the distribution of associative groups along the chain was random. The extensive investigation leading to the instant invention showed that the use of randomly-placed associative groups causes the chains to collapse. That is the molecular-level reason that relatively high concentrations (>3000 ppm) of FM-9 were needed in order to be effective in mist suppression. (See, e.g., Knight, J. U.S. Pat. No. 4,396,398, the disclosure of which is incorporated herein by reference.) In the dilute regime of interest for fuel additives, a polymer with randomly-placed associative groups loses its efficacy and is even less effective than linear non-associating chains of the same molecular weight. (See, e.g., David, R. L. A., Ph.D. Dissertation, California Institute of Technology, Pasadena, Calif., 2008, the disclosure of which is incorporated herein by reference.) In addition, the research leading to the instant invention showed that randomly-placed associating sites lead to phase separation. That is the reason that FM-9 tended to phase-separate, which precluded storage of fuel containing the additive and caused problems when the fuel was used at low temperatures. In addition to chain collapse, FM-9 also suffered from loss of efficacy at high temperature and high affinity to water (Table 1). The research leading to the instant invention further showed that inherent limitations of polymers with randomly-placed associative groups are not remedied by using donor~acceptor interactions between randomly-distributed associative groups. Thus, there were no successful design principles for mist-control polymers, despite decades of prior effort. The associative polymers of the instant invention prevent shear degradation and chain collapse; remain in solution at low temperature; and remain effective at high temperature. The resulting advantages of the inventive polymers over past mist-control polymers and the current state of the associative polymer research are summarized in Table 1, below.

TABLE 1

Comparison of Conventional and Inventive Polymers

| Criteria | PIB > 10M | Prior Associative Polymers | Caltech Polymers |
|---|---|---|---|
| Logistics | (−) must be added at time of fueling, because it is destroyed during pumping | (+) can be added prior to fueling, because it resists shear degradation. (−) phase separates, clogging filters | (+) added at the refinery-stable with respect to pumping, temperature, filtration |
| Efficacy | (−) only works until it passes through pumps | (−) less effective than the non-associating polymer would be | (+) as effective as >1M linear polymer (+) keeps efficacy even when pumped |
| Combustion | (+) polymer burns cleanly | (+) very few heteroatoms (O,N), within the specifications of fuel | (+) polymer burns cleanly (>99.9% C,H) |
| Field Temperature Range | (+) remains soluble over entire field T range (−40° F. to 140° F.) | (−) phase separates at low T (clogging filters and settling in fuel tanks) (−) associations fail at high T | (+) does not phase separate at low T (+) remains active at high T |

Discussion of Inventive Associative Mist Control Polymers

As discussed above, previous attempts to form mist control polymers have focused on linear chains possessing associating functional groups grafted at random positions along the entire chains. What these techniques fail to appreciate is that randomly placed 'stickers' cause chains to collapse. Specifically, the scientific fundamentals of self- and complementary-association of polymer chains (see, e.g., David, R. L. A., "Associative polymers as anti-misting agents and other functional materials via thiol-ene coupling", Ph.D. Dissertation, California Institute of Technology, Pasadena, Calif., 2008; David, R L A; et al., *Macromolecules,* 42, 1380-1391 (2009); and David, R L A; et al., *Polymer,* 50, 6323-6330 (2009),), the disclosures of each of which are incorporated herein by reference) show that the chain-collapse and solubility issues of prior associative polymers for mist control, such as, for example, FM-9 arise from random placement of associating groups along polymer backbones.

The current invention describes associative mist control polymers that are controllably associated. In the development of the associative mist control polymers of the current invention, molecular designs involving both self-associating interactions and donor-acceptor interactions were studied, and the effects of extent of functionalization as well as concentration of polymer components on shear and extensional rheology of dilute solutions in non-polar hydrocarbon solvents were examined. As will be discussed in greater detail in the exemplary embodiments below, these studies have made it clear that not all associative polymers can be effective for mist control. For example, it has been discovered that for both self-associating and donor-acceptor systems, intra- and intermolecular associations cause collapse of chains with randomly distributed associative groups and interfere with the mechanism of mist control by inhibiting stretching of the chain in extentional flow. Based on these observations, it has been discovered that clustering associative groups and connecting them via long, fuel-soluble chains mitigates chain collapse, particularly when complementary pairs of associating groups are used.

Accordingly, the current invention provides a molecular design of associative mist-control polymer additives comprising groupings or clusters of associative groups separated by one or more long blocks that render the mist control additive soluble in a particular medium, such as, for example, aviation fuel. For the proper functioning of the mist control materials, the associative groups of the instant invention must have two key properties: they must not self-associate and they must associate with a strength that is less than that of a covalent bond.

Figures 2, 3:
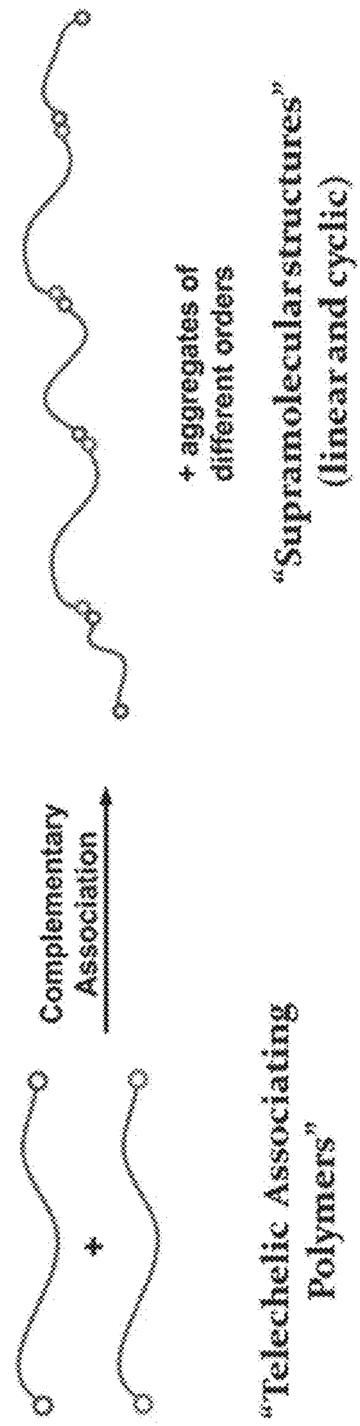
FIG. 2 provides a general scheme for the synthesis of mist control supramolecules from polymer chains in accordance with one embodiment of the invention.
FIG. 3 provides a general scheme for the self-assembly of mist control agents in accordance with one embodiment of the invention in which loops are prohibited and associations result in the formation of well-defined linear chains.

In one preferred embodiment, shown schematically in FIG. 2, the mist control additives of the instant invention are binary mixtures of donor and acceptor polymers or chains with complementary associating groups clustered near the chain ends (i.e., "telechelic" polymers, FIG. 2, left). In the mist control additives of the current invention, the majority of the chain is a polymer that provides solubility in fuels, whereas clusters of associative groups, such as short blocks with associative side groups, provide reversible association holding polymer chains together into very long "super chains" (FIG. 2, right). In a preferred embodiment, the donor chains are triblock copolymers with a very long fuel-soluble midblock and two short endblocks that preferably contain more than five associative donor groups, and the acceptor chains are triblock copolymers with a very long fuel-soluble midblock and two short endblocks that preferably contain more than five associative acceptor groups.

Although many complementary polymers may meet the broad structural requirements discussed above, there are two fundamental requirements of the mist control additives of the instant invention that must be met. Specifically, the mist control materials must be made of individual polymer chains that are short enough to survive flow conditions encountered in pumping fuel (FIG. 2, left); and yet are able to assemble and reassemble into supramolecules that are long enough to suppress misting (FIG. 2, right). More specifically, the inventive complementary polymers of the instant invention have the following characteristics:

- Have specially designed length (between 100 to 1000 kg/mol) so they do not degrade upon passage through pumps,
- Are formed of specially selected monomers that provide solubility to the complementary polymers in a particular medium (such as, for example fuel) over a wide temperature range (−40° C. to +60° C.) such that the medium/mist control material mixture remains a homogeneous, single phase during storage, and Have specially selected associative clusters that are designed to have other important properties including:
- the clusters do not self-associate (i.e., in FIG. 2, open circle ends do not attract each other; likewise for the solid square ends),
- the clusters associate in donor-acceptor, complementary pairs to form large supramolecular structures that are open and flexible so they suppress misting,
- the clusters form associations that are weaker than covalent bonds (so they protect against shear degradation, allowing supramolecular chains to pull apart without chemical degradation during passage through pumps and filters), and
- the clusters form associations that are strong enough to retain efficacy at temperatures up to 40° C., and preferably 60° C.

Although not essential, in a preferred embodiment, the complementary polymers of the instant invention are also selected, such that the supramolecules formed through their association are primarily of a linear structure (i.e., the concentration of linear supramolecules is greater than that of branched or cyclic supramolecules. In still another embodiment of the invention, the supramolecules have a well-defined length (i.e., a specific number of complementary polymers combine together into the supramolecule).

Although it should be understood that this is not intended to be an exhaustive listing of applicable mist control materials that meet the requirements listed above, some exemplary polymers are provided here. As a starting point, any polymer backbone that provides good solubility in a desired medium (e.g., fuels) and elasticity for mist-control may be used. In a preferred embodiment the fuel soluble domains used in the current invention have a molar mass greater than 100,000 g/mol or a degree of polymerization greater than 1000. In a more preferred embodiment, the fuel-soluble domain has an unsaturated hydrocarbon structure. In still another ROMP monomers (either homopolymers or copolymers) with sufficient ring strain are chosen. Exemplary embodiments of fuel-soluble domains include homopolymers or copolymers synthesized by ring opening metathesis (ROMP) of one or more cyclic alkenes, including, but not limited to, Norbornene derivatives (for example, norbornene, 5-Ethylidene-2-norbornene, alkyl-5-norbornene-2,3-dicarboximide (e.g., N-(2-Ethylhexyl)-5-norbornene-2,3-dicarboximide), cyclooctene, cyclooctadiene, trans,trans,cis-1,5,9-cyclododecatriene, etc. Still other exemplary embodiments of fuel-soluble domains include polyisoprene, polybutadiene and their copolymers and derivatives that can be prepared by anionic or radical polymerization. Certain saturated hydrocarbon polymers can serve as fuel-soluble domains, notably polyisobutylene (PIB).

Likewise, the donor~acceptor interactions may be chosen from a variety of complementary pairs, including, but not limited to, hydrogen bond donor/acceptor pairs, charge transfer donor/acceptor pairs and ionic bond donor/acceptor pairs. Although not meant to be exhaustive, exemplary associating groups for each category are listed as follows:

- Acid/base pairs: carboxylic acid (proton donor)/tertiary amine (proton acceptor), wherein the tertiary amine may include, for example, (dimethylamino)alkyl groups, (diethylamino)alkyl groups, (methylethylamino)alkyl groups, and pyridyl groups.
- Hydrogen bonding pairs: hydroxyphenyl/pyridyl group and 2,4-Bis(propylamido)pyridine/Hydrouracil pairs.
- Charge transfer pairs: where exemplary electron donors are carbazole derivatives (e.g., carbazolyl group, 3,6-diamino-carbazolyl group, (carbazolylmethylene)-aniline group); and N,N-dimethylanilino group, and where the exemplary electron acceptors are dinitrophenyl group; 3,6-dinitro-carbazolyl group; buckminsterfullerene ($C_{60}$); 4-bromo-1-naphthyl group, dansyl group, anthracene, pyrene, 2,3,5,6-tetrafluorophenyl group, and cyanophenyl group.

Exemplary modes of incorporating these clusters of associative groups into the polymers of the invention may include any compatible method, including, for example, comonomers, dendrimers, nanoparticles and specially designed chemical units that confer polyvalent association.

Although thus far the discussion has focused on the mist control materials themselves, the current invention is also directed to methods of controllably forming such mist control materials. There are many synthetic routes to such materials, including some suitable for industrial production. In general terms, however, the scheme shown in FIG. 3 is preferably implemented, where the A+B interactions involve acid-base associations (e.g., between phenol and tertiary amine moieties), and the C+D interactions involve electron donor-acceptor associations (e.g., between carbazole and dinitrobenzene derivatives.) One key advantage of this synthetic route is that the equilibrium constants of association of the A+B and C+D endblocks can be conveniently modified by simply changing the number of functional moieties featured on the endblocks. In addition, because this synthetic scheme involves two sets of specific interactions, where A endgroups interact only with B endgroups, and C endgroups likewise only with D endgroups, loops may be prohibited such that associations result in the systematic formation of well-defined linear chains. For example, the molecules may be designed such that for a stoichiometric blend of the building blocks, and at high enough binding affinity of the A+B and C+D associations, nearly all the polymer chains should assemble into pentamers (in 4 bond-forming events only) even at arbitrarily low polymer volume fraction $\phi_{total}$. As a result, satisfactory mist suppression could be achieved with <100 ppm of A----A, B----C, and D---- chains of size $MW=10^6$ g/mol.

Figure 4:
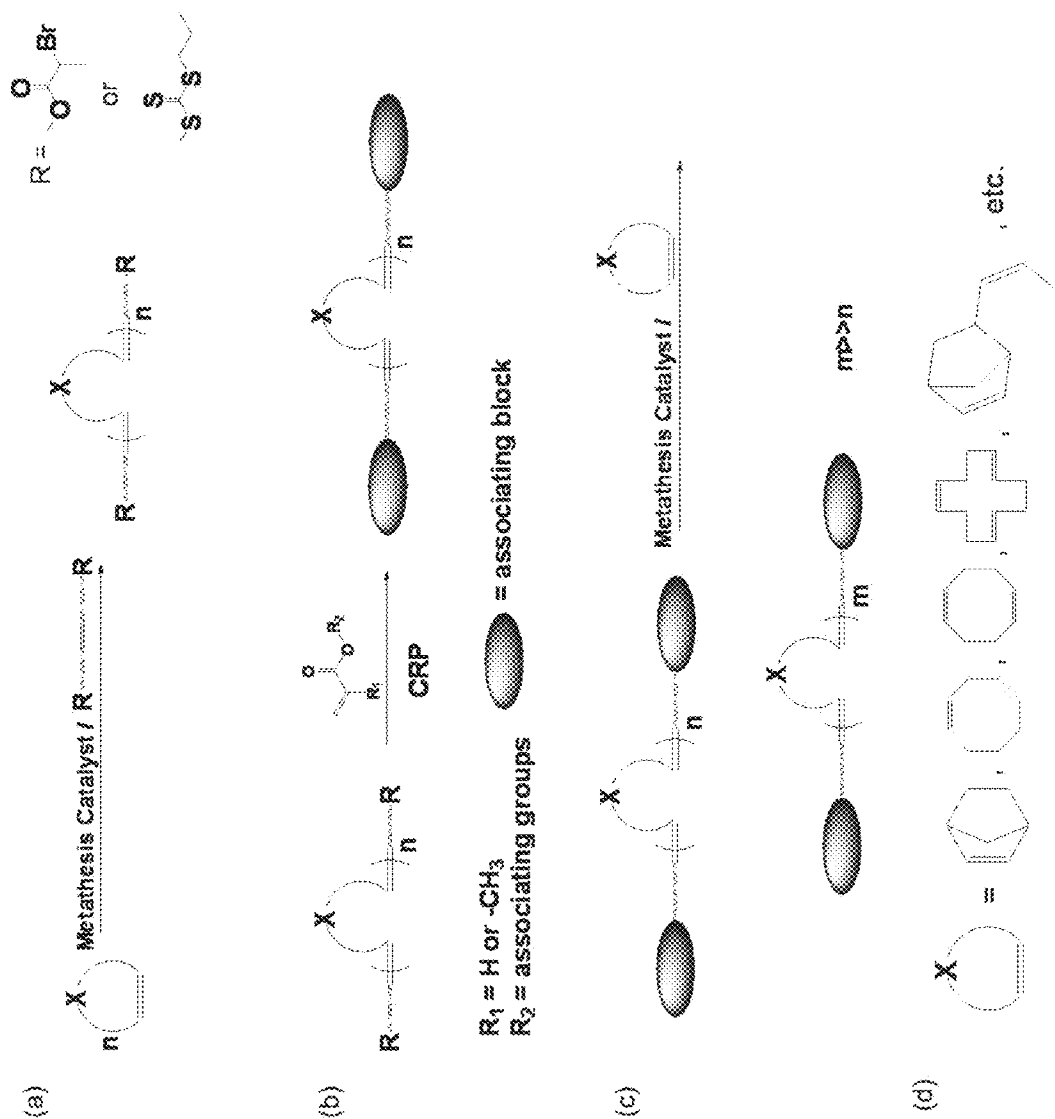
FIG. 4 provides a scheme for the self-assembly of mist control agents in accordance with one embodiment of the instant invention comprising telechelic chains with associative clusters at each end, where (a) shows the synthesis of precursor short chains that have double bonds in the middle and an initiator "R" at each end ("X" denotes an alkane (e.g., cyclopentane or hexane, (b) shows the synthesis of a precursor of a macro-chain transfer agent through ROMP, (c) shows the growth of associating blocks using CRP, and (d) representative cycloolefin monomers suitable for ring opening metathesis polymerization that can be used individually or in combination to produce long, fuel-soluble homopolymer or copolymer chains in the presence of the desired chain transfer agent, CTA.

One exemplary synthetic pathway that meets the above criteria, and that would be capable of producing polymers that meet the design criteria for mist control agents in accordance with the current invention, is shown in FIG. 4. In this embodiment, mist control agents are synthesized using a combination of ruthenium-catalyzed ring-open metathesis polymerization (ROMP) and controlled radical polymerization (CRP). More specifically, in this embodiment, clusters of associating groups would be prepared using CRP techniques, such as atom-transfer radical polymerization (ATRP) and reversible addition-fragmentation chain transfer polymerization (RAFT), while difunctional macroinitiators would be prepared using ROMP (as shown in FIG. 4*a*). In this embodiment, to facilitate subsequent addition to the ends of the polymer chains, the desired clusters of associating groups may, in turn, be grown from each side of pre-polymer (as shown in FIG. 4*b*). The desired telechelic polymers are, in turn, synthesized by performing ROMP in the presence of a custom chain transfer agent (FIG. 4*c*). In a preferred embodiment, these custom chain transfer agents have alkene units in the middle, flanked by clusters of associative groups providing a bridge between ROMP and CRP.

Although the above provides a relatively generic discussion of a possible synthetic pathway for producing the mist control agents of the instant invention, it should be understood that there are several design criteria that should be used in selecting the monomers or chains used in the synthesis:

The polymers should be designed to ensure good solubility in a selected medium, such as, for example, fuels, clean combustion and hydrophobicity. In the case of fuels, one means of attaining this goal is to select polymers that have a composition similar to the fuel itself (i.e., polymers that incorporate alkane and alkene units).

The medium (e.g., fuel) soluble domains should be produced with high MW and clusters of associating groups should be used to ensure high conversion of the chains to supramolecules. For example, using the above technique it is possible to produce telechelic chains with a total molecular weight of roughly $5\times10^5$ g/mole with approximately 20 associating groups at each end. Within these parameters, the distribution of supramolecules will include a significant population having size 5 million g/mol or more—sufficiently large for mist control.

The associative clusters should be selected and attached to the chains such that they the following properties:
- the clusters do not self-associate,
- the clusters associate in donor-acceptor, complementary pairs to form large supramolecular structures that are open and flexible so they suppress misting,
- the clusters form associations that are weaker than covalent bonds (so they protect against shear degradation, allowing supramolecular chains to pull apart without chemical degradation during passage through pumps and filters), and
- the clusters form associations that are strong enough that they retain efficacy at temperatures up to 40° C., and preferably up to 60° C.

One exemplary embodiment of specific polymeric materials that meet that above criteria and that can be used with the synthetic pathway described in FIG. 4*d*, would be to use cyclic olefins with multiple carbon-carbon double bonds, such as, for example, 1,5-cyclooctadiene (COD) and trans, trans,cis-1,5,9-cyclododecatriene (CDT). These materials can give excellent solubility in fuels, but the lack of strong ring strain limits the molecular weights. However, copolymerization of these monomers with relatively strained cyclic monomers (e.g., norbornene, 1-cyclooctene) that each having a single double can be used to achieve both solubility and high molecular weight. In such an embodiment, complementary pairs of associating groups are chosen to give strong association in fuels. In addition, both hydrogen donor/acceptor pairs (e.g., carboxylic acids/tertiary amines) and electron donor/acceptor pairs (e.g., carbazole/dinitrobenzene) demonstrate desirable properties in hydrophobic media, and, as such, can be successfully used in such an embodiment.

Figure 5:
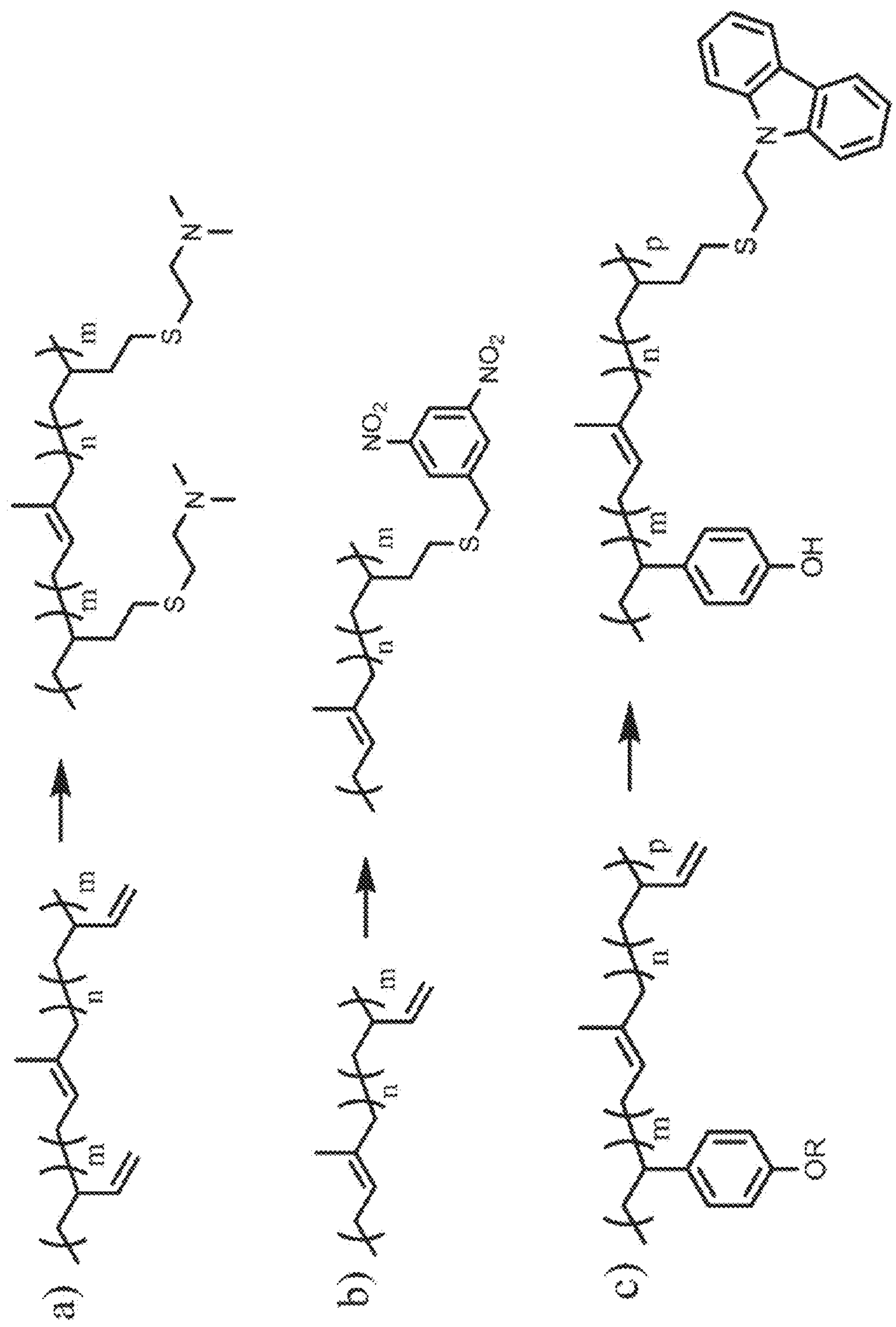
FIG. 5 provides a scheme for the synthesis of an exemplary mist control material in accordance with the current invention, specifically the embodiment illustrated in FIG. 3, where (a) shows an ABA triblock prepared by attaching hydrogen bond acceptors to vinyl groups clustered in each of the end-blocks of the prepolymer, (b) shows an AB diblock prepared by attaching charge transfer electron acceptors to vinyl groups clustered at one end of the prepolymer, and (c) shows an ABC triblock with hydrogen bond donors at one end and charge transfer electron donors at the other end, prepared by attaching charge transfer groups to vinyl groups that were present only in one end-block of the prepolymer.

FIG. 5 provides an alternative synthesis pathway that uses anionic block copolymerization and subsequent functionalization of the 1,2 polybutadiene vinyl groups. In this embodiment, the block copolymers contain long PI segments and subsequent functionalization (n=7,000-15,000 and m, p=10-40 units.) R is a protecting group for the phenol moiety, e.g. t-butyl, acetyl, or t-butyldimethylsilyl. The molecules on the left would be synthesized via anionic block copolymerization, and subsequent functionalization of the 1,2 PB segments (to obtain the molecules on the right) would be achieved by radical addition of the corresponding thiols using AIBN. In this embodiment, carbazole, dinitrobenzene, carboxylic acid, or tertiary amine functionalities can be incorporated.

Although embodiments of the invention incorporating a telechelic synthesis are described above, it should be understood that alternative synthetic pathways may be used. For example, on an industrial scale, it may cost effective to make the associative polymers of the instant invention by condensation from prepolymers (P) with reactive ends and separately produced associative clusters (A). In such an embodiment, when the associative precursors are present in excess, the resulting product will be a mixture that mainly contains the following combinations:

A-P;

A-B-A;

A-P-A-P-A; and small concentrations of still larger products.

The presence of species that contain the desired A-P-A motif within them (such as A-P-A-P and A-P-A-P-A, etc.) also contribute to the formation of desired supramolecules.

Although the above discussion has focused on mist control materials and their synthesis, the invention is also directed to methods of suppressing mist using the molecules set forth herein. Moreover, it should be understood that, although an assumption is made throughout that the mist control agents of the instant invention will be used to suppress misting in hydrocarbon fuels, one skilled in the art would realize that this polymer design can be extended to other fluids (e.g., aqueous media) to suppress misting and/or reduce drag.

As described above, the molecular design of the current invention addresses a number of deficiencies found in conventional polymeric mist control additives and its use will allow for the effective control of mist in a number of contexts:

The molecular design addresses the problem of flow induced degradation. It has been demonstrated that 30 million MW polyolefins chains introduced into fuel transportation pipes were consistently degraded to chains of average MW 1.6 million featuring low polydispersity. The current system is able to produce chains were the upper limit of MW for degradation resistant chains will either be above or within the 0.5-1 million MW range required for effective mist control.

The molecular design ensures that self-assembly results in structures, which impart sufficient mist-control behavior to the fuel. The molecules of the current invention are designed such that both intramolecular interactions and loop formation are prohibited, and associations are unsusceptible to chain collapse. Furthermore, in a preferred embodiment, these molecules form a stoechiometric blend of the building blocks, such that virtually all the polymer chains will belong to linear pentamers independent of concentration above a threshold value, which depends on the equilibrium constants of the A+B and C+D associations. Using the result of Chao et al., which showed that linear polyisobutylene chains of molecular weight 6 million were very effective at reducing the flammability of sprays of Jet-A at concentrations as low as 50 ppm, suggests that linear aggregates of molecular weight 2.5 to 5 million will be effective mist-control agents at concentrations as low as from 100-1000 ppm. (See, e.g., Chao K. K., et al., *AIChE J.* 30 111-120 (1984), the disclosure of which is incorporated herein by reference.)

The molecular design accounts for the need to have aggregates form again rapidly after breakup by the flow. The dynamics of aggregate re-formation are governed by diffusion. Consider the A and B endgroups of two model polymer chains (only one endgroup per chain) of size 0.5 million MW at polymer concentrations of 250 ppm each, in good solvent (this corresponds to the dilute regime.) Assuming that the endgroups are ~1 nm in size, i.e. on the order of the size of a monomer, and that they 'stick' as soon as they come within that distance of each other, it can be estimated that the time it takes for 90% of the molecules of the instant invention to form dimers would be of the order of only 1 sec (based on the diffusion coefficient of the chains).

EXEMPLARY EMBODIMENTS

The person skilled in the art will recognize that additional embodiments according to the invention are contemplated as being within the scope of the foregoing generic disclosure, and no disclaimer is in any way intended by the foregoing, non-limiting examples.

Example 1

Development of a Theoretical Model

Herein, a theoretical underpinning is provided that describes how molecules can be designed that overcome chain collapse by clustering associating groups at the ends of polymer chains. In particular, a model is constructed that can predict for long linear chains endcapped with strongly associating groups, the equilibrium partitioning of the polymer into supramolecular chains and supramolecular loops of all sizes.

Figure 6:
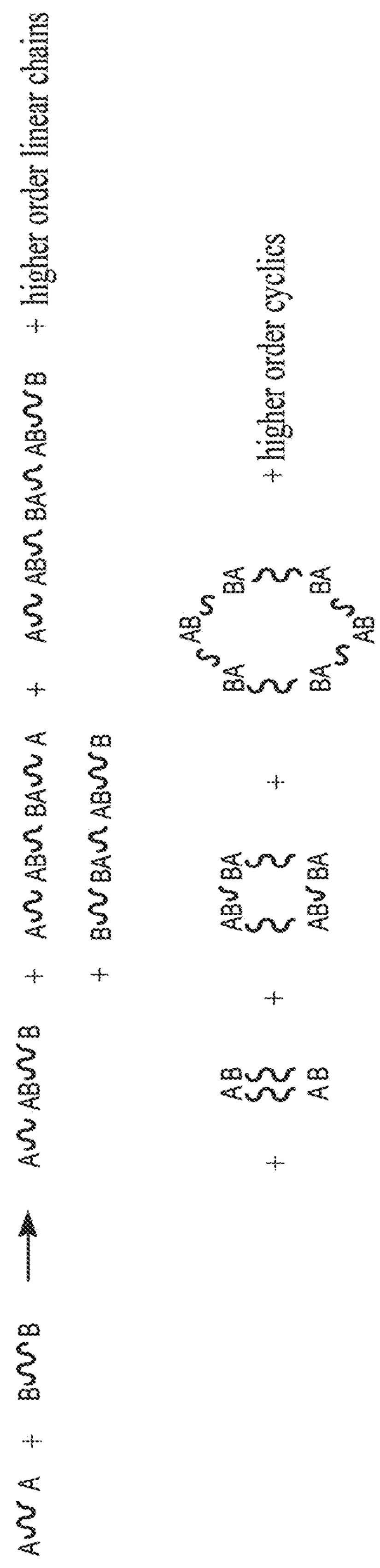
FIG. 6 provides molecular designs for self-assembly of polymeric building blocks into larger supramolecules via physical interactions for a pair of telechelic polymers, one with donors clustered at both of its end and the other with acceptors clustered at both of its ends, leading to a series of equilibriums between linear supramolecules and cyclic supramolecules.

In the model, it is assumed that the A and B endgroups associate with each other pair-wise with interaction energy $\epsilon kT$, but that neither the A nor the B endgroups self-associate. Under these assumptions, to model the equilibrium aggregation of telechelic polymers A----A and B----B into supramolecular cyclic and linear chains of any length (see, scheme provided in FIG. 6), the simpler case of association of telechelic polymers $A_1$----$A_2$ and $B_1$----$B_2$, is first considered. In doing so, it can be assumed that the end-groups $A_1$ and $A_2$, and likewise $B_1$ and $B_2$, are distinguishable but of identical reactivity (as might be the case, for example, if one atom of $A_1$ were a different isotope than the corresponding atom of $A_2$). Using the lattice model provided, which is described in greater detail below, it is possible to determine the equilibrium distribution of all the aggregates for a given energy of association $\epsilon kT$. (Discussion of a comparable lattice model can be found in Goldstein, R. E., *Journal of Chemical Physics* 1986, 84, (6), 3367-3378, the disclosure of which is incorporated herein by reference.)

Consider a solution composed of $N_s$ solvent molecules and $N_{Atotal}$ and $N_{Btotal}$ telechelic $A_1$----$A_2$ and $B_1$----$B_2$ chains, of respective length $M_A$ and $M_B$ elementary units (monomers). The solution volume V is partitioned into lattice sites of volume $a^{3}$' where $a^3$ is the volume of a solvent molecule and also the volume of a monomer. The assumption can be made that there is no volume change upon mixing, so that $V=a^3(N_s+N_{Atotal}M_A+N_{Btotal}N_B)=\Lambda a^3$, where $\Lambda$ is the total number of "sites." In these calculations, the subscript s refers to the solvent and the subscripts i or j refer to single-chain and supramolecular components. Unless otherwise specified, sums $\Sigma_j$ are over all polymer components in solution, i.e., the telechelic starting materials and all polymer aggregates. The volume fractions of solvent and polymer component j are $\phi_s=N_s/L$ and $\phi_j$–$N_jM_j/L$, where $M_j$ is the number of monomers of polymer component j. Let $\phi=\Sigma_j M_j N_j/\Lambda=1-\phi_s$ denote the total polymer volume fraction in solution. The center-of-mass and configurational entropy of the polymer components and solvent is:

$$S=k\sum_j \ln\Omega(0,N_j)+\Delta S_{mix} \quad \text{(EQ. 1)}$$

where $\Omega(0,N_j)$ is the number of possible configurations of $N_j$ molecules of polymer component j, each of length $M_j$, onto $M_jN_j$ sites (referring to pure polymer before mixing), so that the sum accounts for the entropy of all the polymer components before mixing. Here the notation of Hill has been retained for the entropy of a pure solution of $N_i$ linear polymer chains of length $M_i$ according to:

$$\ln\Omega(0,N_i)= -N_i\ln N_i+N_i+M_iN_i\ln(M_iN_i)-M_iN_i+N_i(M_i-1)\ln\left(\frac{c-1}{M_iN_i}\right) \quad \text{(EQ. 2)}$$

where c is the coordination number, i.e., the number of sites neighboring any given monomer where the next monomer on the chain may be found. (See, e.g., Hill, T. L., *An Introduction to Statistical Thermodynamics*, Dover Publications: 1986; pp. 402-404, the disclosure of which is incorporated herein by reference.) The entropy of mixing of the solvent and all polymer components, $\Delta S_{mix}$, is approximated using the Flory-Huggins expression:

$$\Delta S_{mix}=-k\left(N_s\ln\phi_s+\sum_j N_j\ln\phi_j\right). \quad \text{(EQ. 3)}$$

Equation 1 does not account for the entropic cost of loop closure for supramolecular cycles; that contribution will instead be absorbed into the standard chemical potential of the cyclic components, as discussed later. The entropic contribution to the mixture's free energy is therefore:

$$\begin{aligned} F_S &= -T\Delta S_{mix}-kT\sum_j \ln\Omega(0,N_j) \quad \text{(EQ. 4)}\\ &= kT\left[N_s\ln\left(\frac{N_s}{\Omega}\right)+\sum_j N_j\ln\left(\frac{N_j}{\Omega}\right)\right]+ \\ &\quad kT\sum_j N_j\ln(M_j)-kT\sum_j \ln\Omega(0,N_j). \end{aligned}$$

Next, the contribution to the solution free energy due to solvent-solvent, polymer-solvent, and polymer-polymer interactions is estimated by the random mixing approximation:

$$F_{int}=\Omega\delta[(1-\phi)^2h_{ss}+\phi^2h_{pp}+2\phi(1-\phi)h_{ps}] \quad \text{(EQ. 5)}$$

where $\delta$ is one-half the local coordination number, and $h_{ij}$ are the microscopic interaction energies of the polymer and solvent species. The total free energy F of the solution is the sum of $F_S$, $F_{int}$, and of contributions from the internal free energy of solvent and polymer components:

$$F = F_{int} + F_S + N_s\mu_s^0 + \sum_j N_j\mu_j^0 \quad \text{(EQ. 6)}$$

where $\mu_i^0$ is the standard chemical potential of the single-chain or supramolecular chain component i. Using $\phi=(M_iN_i+\Sigma_{j\neq i}M_jN_j)/\Lambda$ with $\Lambda=N_s+M_iN_i+\Sigma_{j\neq i}M_jN_j$, the contribution to the chemical potential of polymer component i due to interactions is:

$$\mu_{int,i} = \frac{\partial F_{int}}{\partial N_i}\Big|_{N_{j\neq i}} = -\omega M_i\phi_s^2 + \omega_{pp}M_i \quad \text{(EQ. 7)}$$

where for convenience we have introduced $\omega_{mn}=\delta h_{mn}$ and $\omega=\omega_{pp}+\omega_{ss}-2\omega_{ps}$. The entropic contribution to the chemical potential of polymer component i is:

$$\frac{\mu_{S,j}}{kT} = \frac{1}{kT}\frac{\partial F_S}{\partial N_i}\Big|_{N_{j\neq i}} = \ln\left(\frac{\phi_i}{M_i}\right) + 1 - \phi_i - M_i\left[\phi_s + \sum_{j\neq i}\frac{\phi_j}{M_j}\right] + \ln M_i - 1 - M_i[\ln(c-1) - 1] - \ln M_i + \ln(c-1) \quad \text{(EQ. 8)}$$

or, after rearranging:

$$\frac{1}{kT}\frac{\partial F_S}{\partial N_i}\Big|_{N_{j\neq i}} = \ln\left(\frac{\phi_i}{M_i}\right) - M_i\left[\phi_s + \sum_j\frac{\phi_j}{M_j}\right] + f_i \quad \text{(EQ. 9)}$$

where $f_i=\ln(c-1)+M_i[1-\ln(c-1)]$. Differentiation of EQ. 6 and substitution of EQs. 7 and 9 give the following expression for the chemical potential of component i, valid for the single-chain building blocks and all aggregates:

$$\mu_i = \frac{\partial F}{\partial N_i}\Big|_{N_{j\neq i}} = \mu_i^0 + kT\left\{\ln\left(\frac{\phi_i}{M_i}\right) - M_i\left[\phi_s + \sum_j\frac{\phi_j}{M_j}\right] + f_i\right\} - \omega M_i\phi_s^2 + \omega_{pp}M_i. \quad \text{(EQ. 10)}$$

Consider a supramolecular component i made up of $n_i$ $A_1$----$A_2$ building blocks and $m_i$ $B_1$----$B_2$ building blocks: its size is $M_i=n_iM_A+m_iM_B$. At the equilibrium partitioning of the telechelic building blocks into aggregates of all size, its chemical potential satisfies the equilibrium condition:

$$\mu_i=n_i\mu_A+m_i\mu_B \quad \text{(EQ. 11)}$$

where $\mu_A$ and $\mu_B$ are the chemical potentials of building blocks $A_1$----$A_2$ and $B_1$----$B_2$, respectively. Substituting the expressions for $\mu_i$, $\mu_A$, and $\mu_B$ from EQ. 10 into EQ. 11 above, we obtain, after rearrangement, the following mass-action relation for polymer component i:

$$\mu_i^0 + kT\left[\ln\left(\frac{\phi_i}{M_i}\right) + f_i\right] = \quad \text{(4.12)}$$

-continued $$n_i\mu_A^0 + m_i\mu_B^0 + kT\left[n_i\ln\left(\frac{\phi_A}{M_A}\right) + m_i\ln\left(\frac{\phi_B}{M_B}\right) + n_if_A + m_if_B\right]$$

where $\phi_A$, $\phi_B$ are the volume fractions of the telechelic building blocks $A_1$----$A_2$ and $B_1$----$B_2$, respectively. Equation 12 above can be rewritten as follows:

$$\left(\frac{\phi_i}{n_iM_A + m_iM_B}\right) = \left(\frac{\phi_A}{M_A}\right)^{n_i}\left(\frac{\phi_B}{M_B}\right)^{m_i}\exp(\Gamma_i) \quad \text{(EQ. 13)}$$

where $$\Gamma_i = \frac{1}{kT}(n_i\mu_A^0 + m_i\mu_B^0 - \mu_i^0) + (n_i + m_i - 1)\ln(c-1). \quad \text{(EQ. 14)}$$

The conservation equations are then:

$$\phi_{Atotal} = \sum_j\phi_j\left(\frac{n_jM_A}{n_jM_A + m_jM_B}\right) = \sum_j n_jM_A\left(\frac{\phi_A}{M_A}\right)^{n_j}\left(\frac{\phi_B}{M_B}\right)^{m_j}\exp(\Gamma_j) \quad \text{(EQ. 15)}$$

$$\phi_{Btotal} = \sum_j\phi_j\left(\frac{n_jM_B}{n_jM_A + m_jM_B}\right) = \sum_j n_jM_B\left(\frac{\phi_A}{M_A}\right)^{n_j}\left(\frac{\phi_B}{M_B}\right)^{m_j}\exp(\Gamma_j).$$

In this model, terms arising from microscopic interactions, as well as terms arising from the center-of-mass and configurational entropy (except loop closure) of polymer components and solvent in solution have been carried out explicitly. On the other hand, terms arising from (i) the energy of association of the endgroups within a polymer aggregate, and (ii) the entropic cost of loop closure for cyclic supramolecular aggregates, are instead absorbed into the standard chemical potentials $\mu_j^0$ of the aggregates. Expressions accounting for these effects are derived separately, below.

Theoretical Model: Entropic Cost of Loop Closure Calculation

The entropic cost of loop closure is determined by calculating the probability of loop closure, as follows: For Gaussian linear chains of N Kuhn monomers of length b, the probability density function for the end-to-end vector r is:[3]

$$G_{Gaussian}(r, N) = \left(\frac{3}{2\pi Nb^2}\right)^{\frac{3}{2}}\exp\left\{-\frac{3r^2}{2Nb^2}\right\}. \quad \text{(EQ. 16)}$$

The argument within the exponential is $-3r^2/(2Nb^2)\cong 0$ for $\|r\|<<<r^2>^{1/2}$, so the probability that the chain ends be within a small distance x of each other, where $x/b\sim O(1)$, is:

$$G_{cyc,Gaussian} = \left(\frac{3}{2\pi Nb^2}\right)^{\frac{3}{2}}\int_0^{2\pi}d\phi\int_0^{\pi}d\theta\sin\theta\int_0^a dr\cdot r^2\exp(0) = 4\pi\left(\frac{3}{2\pi Nb^2}\right)^{\frac{3}{2}}\int_0^a dr\cdot r^2\exp(0) \quad \text{(EQ. 17)}$$

-continued $$= \left(\frac{6}{\pi N^3}\right)^{\frac{1}{2}} \left(\frac{x}{b}\right)^3.$$

For real chains, excluded volume interactions of the monomers at chain ends reduce the probability density function G(r,N) by the factor $$\frac{G_{real}(r, N)}{G_{Gaussian}(r, N)} \sim \left(\frac{\|r\|}{\sqrt{\langle r^2 \rangle}}\right)^g \quad \text{for } \frac{\|r\|}{\sqrt{\langle r^2 \rangle}} << 1 \tag{EQ. 18}$$

where the exponent g≅0.28,[4] so that the probability of cyclization becomes $$G_{cyc,real} \approx 4\pi\left(\frac{3}{2\pi N b^2}\right)^{\frac{3}{2}} \left(\frac{1}{bN^v}\right)^g \int_0^a dr \cdot r^{2+g} \exp(0) \sim N^{-3/2-gv} \tag{EQ. 19}$$

where the fractal exponent v is 0.588 in good solvent. The loop closure probability thus scales as $N^{-3/2}$ for Gaussian chains and $N^{-1.66}$ for swollen chains. The entropic cost of loop closure is simply $\Delta S_{loop} = -k \ln G_{cyc}$.

In dilute or semi-dilute solutions, all chain segments smaller than the thermal blob $g_T \approx b^6/v^2$ (where v is the excluded volume parameter) have nearly Gaussian statistics because excluded volume interactions are weaker than the thermal energy. If, for a solution composed of any number of different (single and supramolecular) chains j of size $M_j$, at total polymer volume fraction $\phi = \Sigma_j \phi_j$, it is assumed that the polymer chains are dilute enough to ignore polymer-polymer interactions, it is possible to use the following expression in the calculation of the entropic cost of loop closure $\Delta S_{loop} = -k \ln G_{cyc}$ for any cyclic aggregate q:

$$G_{cyc,q} \approx \left(\frac{6}{\pi g_T^3}\right)^{\frac{1}{2}} \left(\frac{x}{b}\right)^3 \left(\frac{M_q}{g_T}\right)^{-1.66}. \tag{EQ. 20}$$

By doing so the assumption is being made that all chain segments larger than $g_T$ are fully swollen.

Theoretical Model: Inventory of Polymer Components Calculation

As a starting point in classifying the polymer aggregates, they are grouped together As a starting point in classifying the polymer aggregates, they are grouped together according to their size and topology: all the components j that belong to any particular group g have the same topology (either linear or cyclic) and have the same $n_i$ (number of $A_1$----$A_2$ building blocks) and $m_i$ (number of $B_1$----$B_2$ building blocks). Consequently all members of a given group g have the same size $M_i = n_i M_A + m_i M_B$ and $\Gamma_j = \Gamma_g$. The model predicts $\phi_g$ refer to the cumulative volume fraction of all the polymer components that belong to group g. The equilibrium condition and the conservation equations can be rewritten as:

$$\left(\frac{\phi_g}{n_g M_g + m_g M_g}\right) = \Omega_g \left(\frac{\phi_A}{M_A}\right)^{n_g} \left(\frac{\phi_B}{M_B}\right)^{m_g} \exp(\Gamma_g) \tag{EQ. 21}$$

-continued $$\phi_{Atotal} = \sum_g n_g M_A \Omega_g \left(\frac{\phi_A}{M_A}\right)^{n_g} \left(\frac{\phi_B}{M_B}\right)^{m_g} \exp(\Gamma_g) \tag{EQ. 22}$$

$$\phi_{Btotal} = \sum_g m_g M_B \Omega_g \left(\frac{\phi_A}{M_A}\right)^{n_g} \left(\frac{\phi_B}{M_B}\right)^{m_g} \exp(\Gamma_g)$$

where $\Omega_g$ refers to the number of distinct species in group g.

It is next necessary to determine how many components belong to each group. For linear aggregates there are two possibilities: (i) if $n_g + m_g$ is even (i.e., $n_g = m_g$), then no sequence read from left to right will be the same as a sequence read from right to left, so the number of ways to arrange the molecules is $\Omega_g = 2^{n_g + m_g}$; (ii) if $n_g + m_g$ is odd, then every sequence read from left to right will have a matching sequence read from right to left, so the number of ways to arrange the molecules is $\Omega_g = 2^{n_g + m_g - 1}$. Supramolecular cycles can only be formed if $n_g = m_g$. The number of ways to form such a loop is derived below; to a very good approximation it is $\Omega_{cyc,g} = 2 + (2^{2n_g - 1} - 2)/n_g$.

Theoretical Model: Number of Ways to Form Loops Calculation

Figure 7:
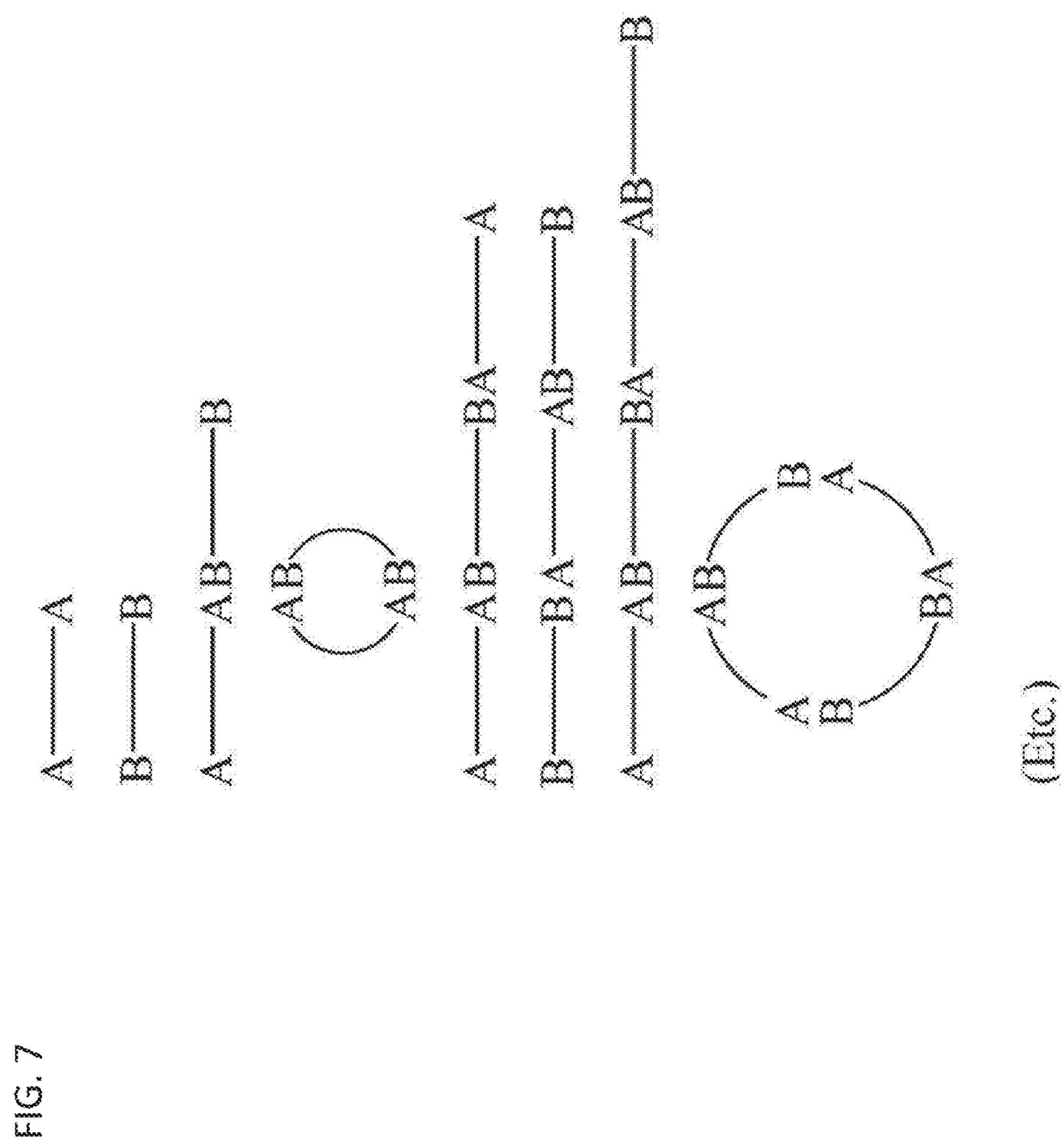
FIG. 7 provides a schematic of the two different telechelic polymer components, and the supramolecules that they form.

It is next necessary to determine the number of different loops that can be formed by linking n $A_1$----$A_2$ and n $B_1$----$B_2$ telechelic chains end-to-end via association of A and B endgroups, as shown in FIG. 7. Again, in this model the $A_1$ groups are being treated as distinguishable from $A_2$ groups, and likewise $B_1$ groups are distinguishable from $B_2$ groups, but that the n $A_1$----$A_2$ molecules are indistinguishable, and likewise are the n $B_1$----$B_2$ molecules. The question is equivalent to the combinatorial problem of counting necklaces formed using beads of different colors, in which two necklaces are considered equivalent if one can be rotated to give the other. The way to recognize the equivalence is to break up the loops into adjacent pairs of telechelics (with one $A_1$----$A_2$ and one $B_1$----$B_2$ molecule per pair), and map the loops into necklaces made up of n beads of 4 different "colors" corresponding to: $A_1A_2B_1B_2$, $A_1A_2B_2B_1$, $A_2A_1B_1B_2$, $A_2A_1B_2B_1$. For example, $A_1A_2B_1B_2$=black, $A_1A_2B_2B_1$=white, $A_2A_1B_1B_2$=blue, and $A_2A_1B_2B_1$=green.) The formula for the number of different necklaces is:

$$m(n) = \frac{1}{n} \sum_{d|n} [\varphi(d) \cdot 4^{n/d}] \tag{EQ. 23}$$

where the sum is over all numbers d that divide n, and ϕ(d) is the Euler phi function. (For a full discussion, see van Lint, J. H. and Wilson, R. M., In *A Course in Combinatorics*, Cambridge University Press: 2001; pp. 522-525, the disclosure of which is incorporated herein by reference.)

In reality, the above formula over counts the number of ways to form polymer loops by a factor of two, as explained in Chapter 4 of David, R. L. A., Ph.D. Dissertation, California Institute of Technology, Pasadena, Calif., 2008. The number of distinct loops s(n) that can be formed by linking n $A_1$----$A_2$ and n $B_1$----$B_2$ telechelic chains end-to-end via association of A and B endgroups is therefore:

$$s(n) = \frac{1}{2n} \sum_{d|n} [\varphi(d) \cdot 4^{n/d}]. \tag{EQ. 24}$$

Theoretical Model: Standard Chemical Potential of Polymer Aggregates

In EQs. 13 to 15 and 21 to 22, the expressions for the standard chemical potential of the aggregates $\mu_j^0$ the contributions due to the energy of association of the endgroups and to the entropic cost of loop closure were absorbed. The equation for the standard chemical potential of any polymer component j within group g is therefore:

$$\mu_g^0 = \begin{cases} n_g\mu_A^0 + m_g\mu_B^0 - \varepsilon kT(n_g+m_g) - kT\ln G_{cycl,g} & \text{if cyclic} \\ n_g\mu_A^0 + m_g\mu_B^0 - \varepsilon kT(n_g+m_g-1) & \text{if linear,} \end{cases} \quad \text{(EQ. 25)}$$

so that $\Gamma_g$ in the equilibrium and conservation relationships (EQ. 21 and 22) is:

$$\Gamma_g = \begin{cases} \varepsilon(n_g+m_i) + (n_i+m_i-1)\ln(c-1) + \ln G_{cycl,g} & \text{if cyclic} \\ \varepsilon(n_g+m_g-1) + (n_g+m_g-1)\ln(c-1) & \text{if linear.} \end{cases} \quad \text{(EQ. 26)}$$

Theoretical Model: Distinguishable versus Indistinguishable Endgroups

Consider the reversible association reactions of the individual chains to form dimeric, linear supramolecules. Let $\phi A$ and $\phi_B$ be the volume fractions of the starting materials, and $\phi_{dimer}$ be the total volume fraction of product dimers. In the case that the chains that only have associative groups at one end (A---- and B----), the equilibrium condition (EQ. 13) is:

$$\left(\frac{\phi_{dimer}}{M_A+M_B}\right) = \left(\frac{\phi_A}{M_A}\right)\left(\frac{\phi_B}{M_B}\right)\exp(\Gamma) \quad \text{(EQ. 27)}$$

and in the case of telechelic chains having distinguishable ends, the equilibrium condition is:

$$\left(\frac{\frac{1}{4}\phi_{dimer}}{M_A+M_B}\right) = \left(\frac{\phi_A}{M_A}\right)\left(\frac{\phi_B}{M_B}\right)\exp(\Gamma) \quad \text{(EQ. 28)}$$

where $M_A$ and $M_B$ are the number of monomers in the starting materials, and $\Gamma = e + \ln(c-1)$ according to EQ. 26. In EQ. 28, ¼ $\phi_{dimer}$ is the volume fraction of each of the product dimers, so the difference between EQs. 27 and 28 simply reflects the difference in the number of ways to form dimers, i.e., $\Omega=4$ for telechelic chains with distinguishable ends, while $\Omega=1$ for chains that are only functionalized at one end. The correspondingly larger equilibrium fraction of dimers in the case of telechelics with distinguishable ends can be intuitively understood to be a mere consequence of the increased contact probability of the endgroups to form the product: the rate of dissociation of dimers is equal in both cases, but the rate of association of reactants is expected to be 4 times greater in the case of telechelic polymers Next the equilibrium condition for the total volume fraction of product dimers in the case of indistinguishable ends (A----A and B----B) is determined. If the endgroups A, $A_1$, and $A_2$ have precisely the same reactivity, and likewise the endgroups B, $B_1$, and $B_2$, there cannot be any difference in the equilibrium partitioning of the molecules between the two telechelic cases (distinguishable vs. indistinguishable ends), so that the equilibrium condition for the indistinguishable case is EQ. 28, not EQ. 27. This argument can be generalized to conclude that the equilibrium among all the species in FIG. 7, where endgroups are indistinguishable, is mathematically the same as the solution which was developed for telechelics $A_1$----$A_2$ and $B_1$----$B_2$, where endgroups are distinguishable. A less careful modeling of the association of telechelic polymers A----A and B----B might miscalculate the cumulative equilibrium volume fraction of polymer aggregates that fall within any group g by omitting the factor $\Omega_g$ in EQ. 21

Theoretical Model: Addition of End-Capping Chains

Addition of "end-capping chains" can be used to alter the relative partitioning into linear vs. cyclic aggregates, and the model can be extended to capture that behavior. Consider the addition of $N_{captotal}$ end-capping A---- chains, of length $M_{cap}$ and total volume fraction $\phi_{captotal}$. Let $p_j=p_g$ refer to the number of end-capping A---- chains in any polymer component j belonging to group g and let $\phi_{cap}$ be the equilibrium volume fraction of free A---- chains. The equilibrium condition for any group g becomes:

$$\left(\frac{\phi_g}{n_gM_A+m_gM_B+p_gM_{cap}}\right) = \Omega_g\left(\frac{\phi_A}{M_A}\right)^{n_g}\left(\frac{\phi_B}{M_B}\right)^{m_g}\left(\frac{\phi_{cap}}{M_{cap}}\right)^{p_g}\exp(\Gamma_g) \quad \text{(EQ. 29)}$$

with $$\Gamma_g = \begin{cases} \varepsilon(n_g+m_g) + (n_g+m_g-1)\ln(c-1) + \ln G_{cycl,g} & \text{if cyclic} \\ (n_g+m_g+p_g-1) + [\varepsilon+\ln(c-1)] & \text{if linear} \end{cases} \quad \text{(EQ. 30)}$$

where for endcapped aggregates $\Omega_{cap,g}=2^{n_g m_g}/p_g$, and the expressions for $\Omega_g$ for cyclic and non-endcapped linear aggregates are given above. The conservation equations become:

$$\phi_{Atotal} = \sum_g n_gM_A\Omega_g\left(\frac{\phi_A}{M_A}\right)^{n_g}\left(\frac{\phi_B}{M_B}\right)^{m_g}\left(\frac{\phi_{cap}}{M_{cap}}\right)^{p_g}\exp(\Gamma_g) \quad \text{(EQ. 31)}$$

$$\phi_{Btotal} = \sum_g m_gM_B\Omega_g\left(\frac{\phi_A}{M_A}\right)^{n_g}\left(\frac{\phi_B}{M_B}\right)^{m_g}\left(\frac{\phi_{cap}}{M_{cap}}\right)^{p_g}\exp(\Gamma_g)$$

$$\phi_{captotal} = \sum_g p_gM_{cap}\Omega_g\left(\frac{\phi_A}{M_A}\right)^{n_g}\left(\frac{\phi_B}{M_B}\right)^{m_g}\left(\frac{\phi_{cap}}{M_{cap}}\right)^{p_g}\exp(\Gamma_g).$$

Example 2

Computational Example

Now that the theoretical model has been explained, it can be used to test whether linear chains possessing strongly associating endgroups can be useful as mist-control additives to aviation fuel. In this section, computational results are given for a case of practical significance that can be tested experimentally using anionically polymerized telechelics: monodisperse polyisoprene (PI) chains with strongly associating endgroups, in dilute solutions in Jet-A solvent.

In addition, it is shown computationally and/or experimentally using modified polybutadiene (PB) chains (shown in FIGS. 1*b* and 1*c*) that in dilute solution, i) self-associating polymer chains (e.g. molecules shown in FIG. 1*b*) collapse onto themselves, becoming less effective mist-control agents than linear non-associating chains of the same molecular weight, and ii) interpolymer complexes formed by blending e.g. proton-donating chains and proton accepting chains (shown in FIG. 1*c*, right) only yield small improvements in mist-suppression compared to the unassociating parent chains (shown in FIG. 1*c*, left), even though the aggregates are 1-2 orders of magnitude larger in molecular weight.

Choice of Parameters

The model thus far has assumed that solvent molecules and polymer elementary units have the same size $a^3$. In general, this cannot be expected. If the volume of a solvent molecule ($v_s$) differs from that of a monomer, it is important to determine the lattice size a, and how many lattice sites M should be assigned to a polymer chain of a particular molecular weight $MW_p$.

In this example, a mixture of $N_s$ solvent molecules and $N_p$ monodisperse polymer chains of molecular weight $MW_p$ is modeled. To preserve the volume fraction and number densities of polymer and solvent molecules, it is required that $N_s a^3 = N_s v_s$ and $N_p M a^3 = N_p (MW_p/MW_o) v_{mon}$, where $v_{mon}$ and $MW_o$ are the volume and molecular weight of a chemical monomer. These conditions require that $a^3 = v_s$ and $M = (MW_p/MW_o)(v_{mon}/a^3)$, meaning that the number and size of the elementary units into which the chains are broken is determined by the solvent size $v_s$. In this way, the freedom to map the polymer chain as desired is sacrificed to: for instance, use of EQs. 16 to 20 assumes that the polymer chain has been mapped into an equivalent freely jointed chain with $M = MW_p/MW_K$ Kuhn monomers, where $MW_K$ is the molecular weight of a Kuhn monomer.

An alternative is to model a solution of $N_p$ monodisperse polymer molecules of given number density $N_p/V$ and volume fraction $\phi_p$. This method lets the monomer size determine the lattice size and renormalizes the number of solvent molecules, as follows. Preserving the polymer volume fraction and number density requires that $N_{s,model} a^3 = N_{s,real} V_s$ and $N_p M a^3 = N_p (MW_p/MW_o) v_{mon}$, where $N_{s,real}$ and $N_{s,model}$ are the number of real and model solvent molecules dissolving the polymer chains, and other parameters are the same as above. In this manner it is possible to map the polymer chains in any number of ways. The cost of that improvement is that the number density of the solvent molecules is not preserved, but since that number does not appear in the equilibrium equations (see, e.g., EQs. 13 & 14), it is not essential.

In the calculation that follows, the latter approach has been used and the chain has been broken into $M = MW_p/MW_K$ Kuhn monomers using $a^3 = v_{mon} MW_K/MW_o = v_K$, where $v_K$ is the volume of a Kuhn monomer, and $N_{s,model} = N_{s,real} v_s/v_K$. More particularly, the polymer is broken in Kuhn monomers of molecular weight $MW_K$, and the lattice size set as $a^3 = v_K = MW_K/(N_A \rho)$, where $N_A$ is Avogadro's constant and ρ is the polymer density. For 1,4-PI polymer, ρ=0.83 g/cm³ and $MW_K$=113 g/mol, giving a a≈6.1 Å. (See, e.g., Rubinstein, M. and Colby, R. H., In *Polymer Physics*, Oxford: 2003; p. 53, Table 2.1, the disclosure of which is incorporated herein by reference.) To quantitate the entropic cost of loop closure, numerical values are needed for the end-to-end distance x we require to close the loop and for the number of monomers in a thermal blob $g_T \approx b^6/v^2$. (For simplicity x/b=1 was chosen.) The excluded volume parameter v was estimated to be such that $v/b^3 \approx 0.10$ for PI in Jet-A, giving $g_T \approx 100$. (This value is obtained from viscosity measurements of 580 kg/mol polyisoprene chains, of polydispersity index 1.22, in Jet-A solvent, by rearrangement of the scaling relation $\phi^* \approx (b^3/v)^{6\nu-3} N^{1-3}$ using swelling exponent ν≈0.588 and overlap concentration φ*≅=0.0049. The number of Kuhn monomers N was estimated using $MW_K$=113, and the overlap concentration was determined according to the criterion [η]φ*≅=1. See, e.g., Rubinstein, M. and Colby, R. H., *Polymer Physics*. Oxford: 2003, Equation 5.19, p. 176, the disclosure of which is incorporated herein by reference.) Finally, it is assumed that the random walks of the chains on the lattice correspond to a coordination number of c=6.

Computations

The following procedure was used to calculate the volume fraction of all polymer components (i.e., single-chain starting materials and aggregates of all sizes) at equilibrium, for polymer solutions of $A_1$----$A_2$ and $B_1$----$B_2$ telechelics and A---- "end-cap" chains of specified molecular weights at specified initial concentrations $\phi_{Atotal}$, $\phi_{Btotal}$, and $\phi_{captotal}$ (polymer components were grouped as shown in FIG. 7):

First, choose a number of groups $T_{groups}$ to include in the analysis (even though there is an infinite number of possible polymer components, it is expected that above a certain size, polymer aggregates will have negligible equilibrium volume fraction and can therefore be ignored);

Calculate $n_g$, $m_g$, $M_g$, $\Omega_g$, $G_{cyc,g}$ (if appropriate), and $\Gamma_g$ for polymer group g, for g=1 . . . $T_{groups}$;

Solve the three conservation equations, EQs. 31, for ($\phi_A$, $\phi_B$, $\phi_{cap}$);

Calculate $\phi_g$ for g=1 . . . $T_{groups}$ using EQ. 29; and

Repeat with a new value of $T_{groups}$ twice that of the previous one until changes in the calculated values of $\phi_g$ from one value of $T_{groups}$ to the next are negligible.

Results

To translate model results into terms relevant to experiment, the equilibrium distribution of aggregates is described in terms of the concentration of the various size supramolecular species. In the context of polymer-induced mist-suppression, all linear aggregates of a given length are equivalent, and all cyclic aggregates of a given length are likewise equivalent. Therefore, the cumulative volume fractions $\phi_{linear}$(MW) and $\phi_{loop}$(MW) of all the linear species and of all the cyclic species of a given molecular weight MW will be used to evaluate the impacts of the following parameters on rheological solution properties: binding energy, concentration and degree of polymerization of the single-chain building blocks, and presence or absence of "end-capping" chains (FIGS. 8 to 14).

Case 1: Mixtures of A----A and B----B Chains Only

At the lowest level of complexity, solutions of telechelics of equal molecular weights ($MW_A = MW_B = MW_p$) and equal initial volume fractions ($\phi_{Atotal} = \phi_{Btotal} = \phi_{total}/2$) are considered. In this case, the problem is reduced to understanding the association behavior as a function of $MW_p$, $\phi_{total}$, and the energy of interaction e.

Comparison of model results for $MW_p = 10^6$ g/mol (labeled 1000 k in figures) at total polymer volume fraction $\phi_{total}$ of 1400 ppm and 800 ppm (FIGS. 8 and 9) demonstrates two important effects of total polymer concentration. First, at fixed $MW_p$ and ϵ, increasing concentration results in a higher fraction of the polymer becoming involved in larger linear aggregates (compare first and second rows in FIGS. 8 and 9): the decrease in $\phi_{linear}$ with increasing aggregate MW is not as sharp at 1400 ppm, and the position of the peak $\phi_{linear}$ vs. MW is shifted to the right at 1400 ppm for each ϵ (most visibly for e=18, left column of FIG. 9). Second, the relative partitioning of the polymer into linear rather than cyclic aggregates is insensitive to total polymer concentration $\phi_{total}$.

Consider now the effect of the length of the individual chains ($MW_p$), by comparing results for $5\times10^5$ chains at 1400 ppm (third row, FIGS. 8 and 9) and $1\times10^6$ g/mol chains at 800 ppm (second row). These concentrations were chosen to correspond to one-fourth of the overlap concentration of the single-chains, i.e., $\phi_{total}=\frac{1}{4}$ f* based on the respective values of $MW_p$. It can be observed that the shape of the $\phi_{linear}$ vs. MW curves for both these systems is nearly identical, for each value of $\epsilon$ investigated. On the other hand, the relative proportion of loops vs. linear chains is substantially higher for the shorter chains, due to the smaller entropic cost of cyclization for shorter loops.

Figure 8:
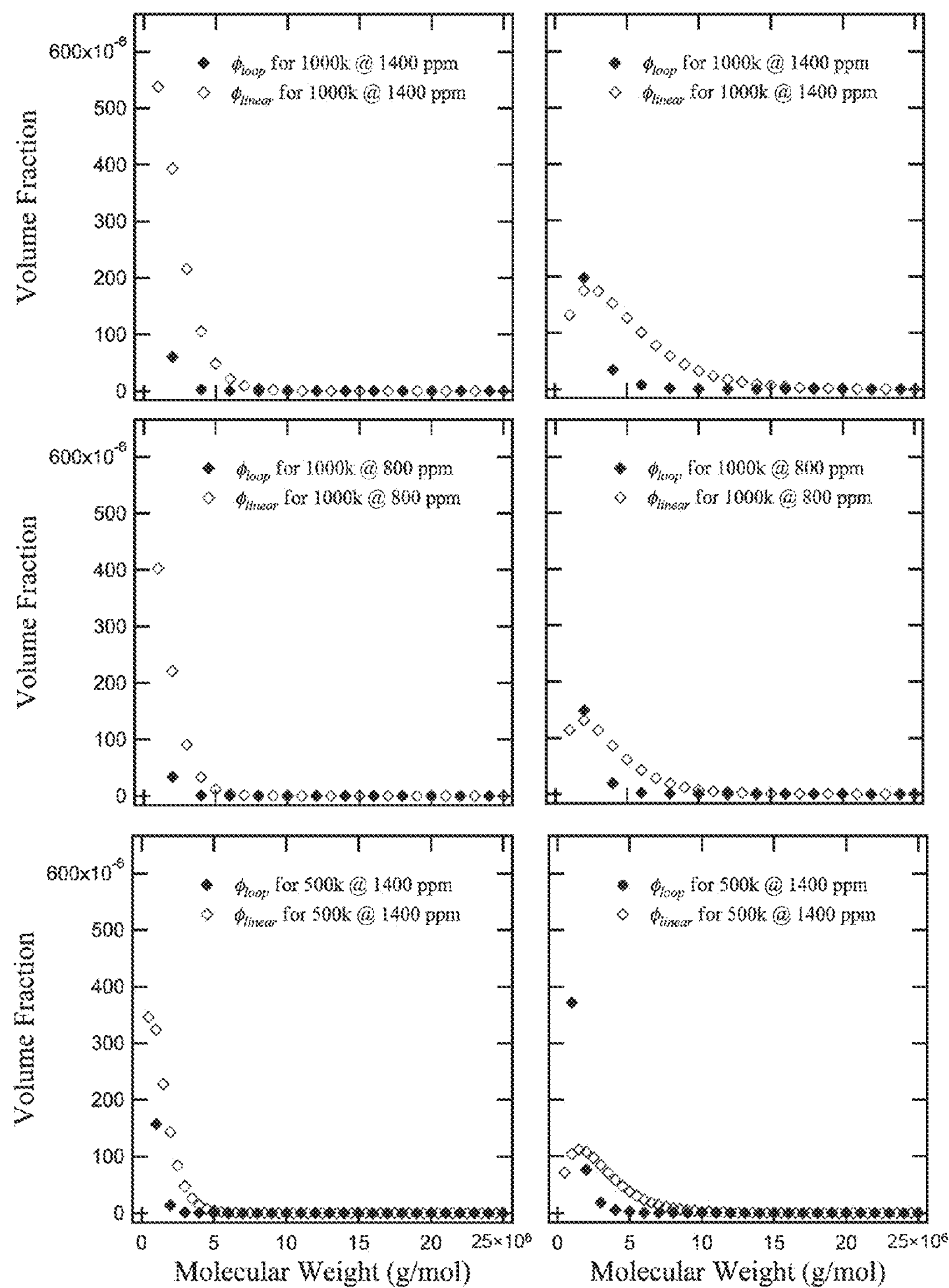
FIG. 8 provides data plots for model predictions for strength of interaction $\epsilon kT=14kT$ (left) and $\epsilon kT=16kT$ (right)
Figure 9:
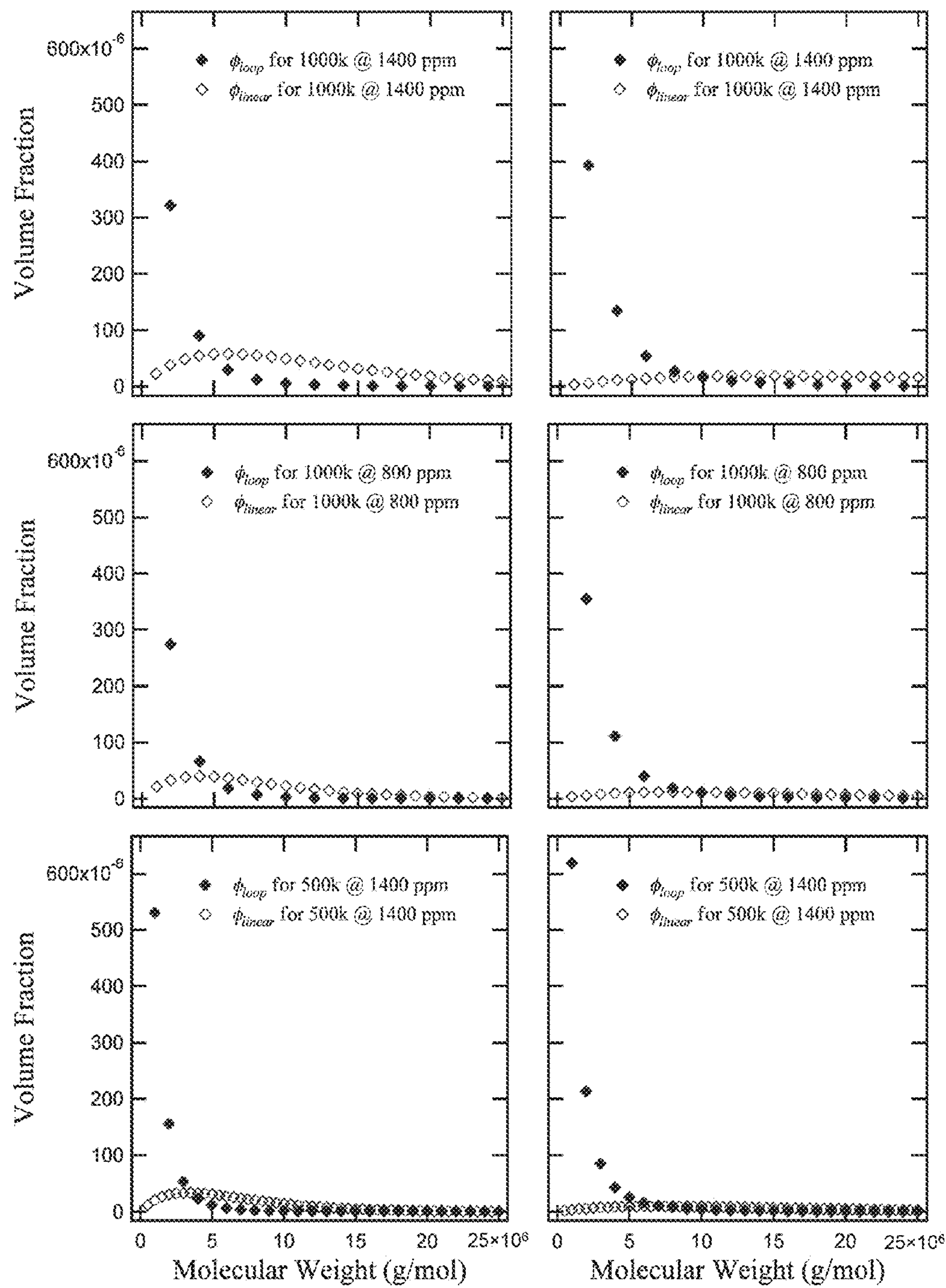
FIG. 9 provides data plots for model predictions for strength of interaction $\epsilon kT=18kT$ (left) and $\epsilon kT=20kT$ (right)
Figure 10:
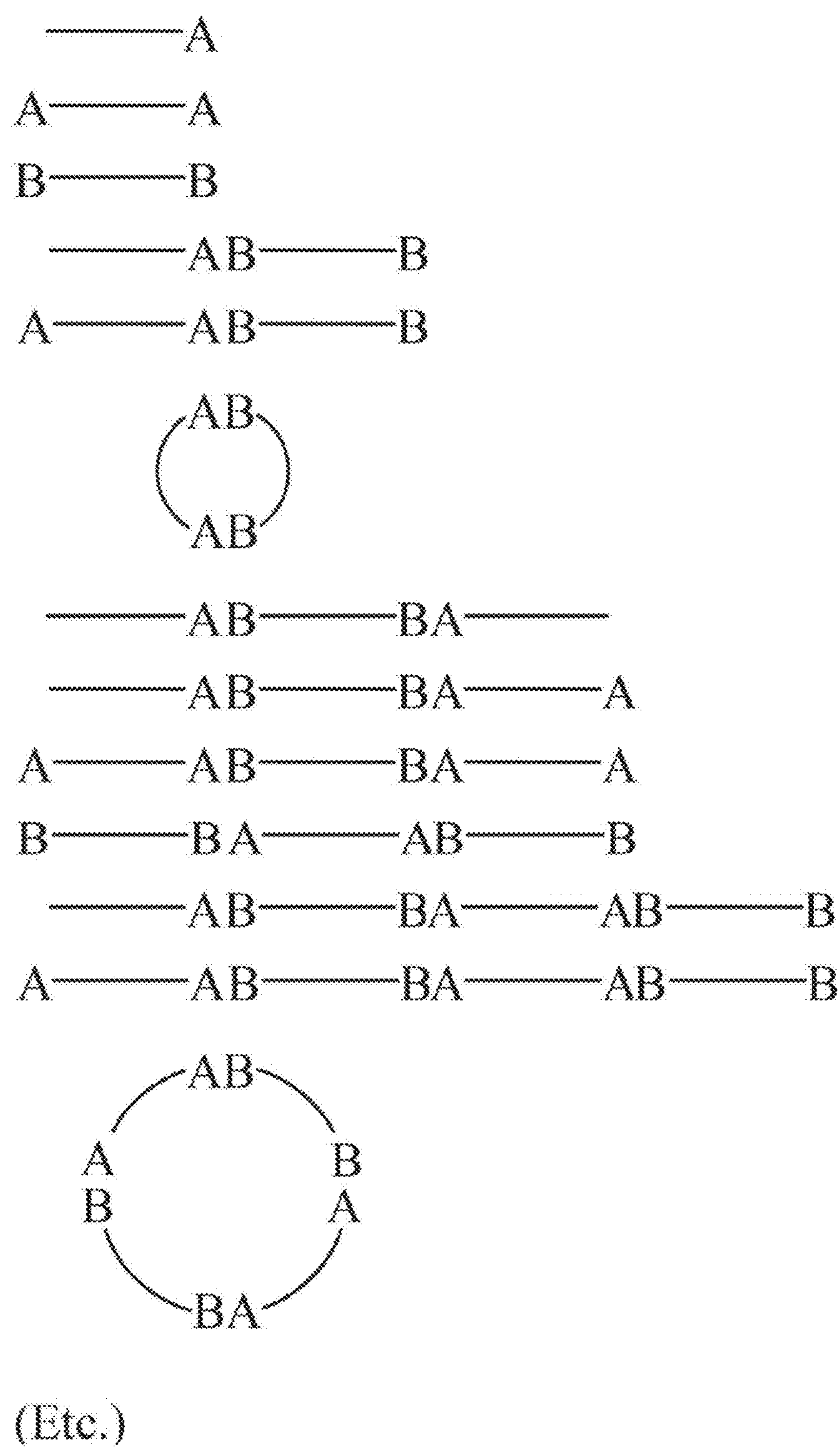
FIG. 10 provides a schematic of exemplary end caps for the polymer components.
Figure 11:
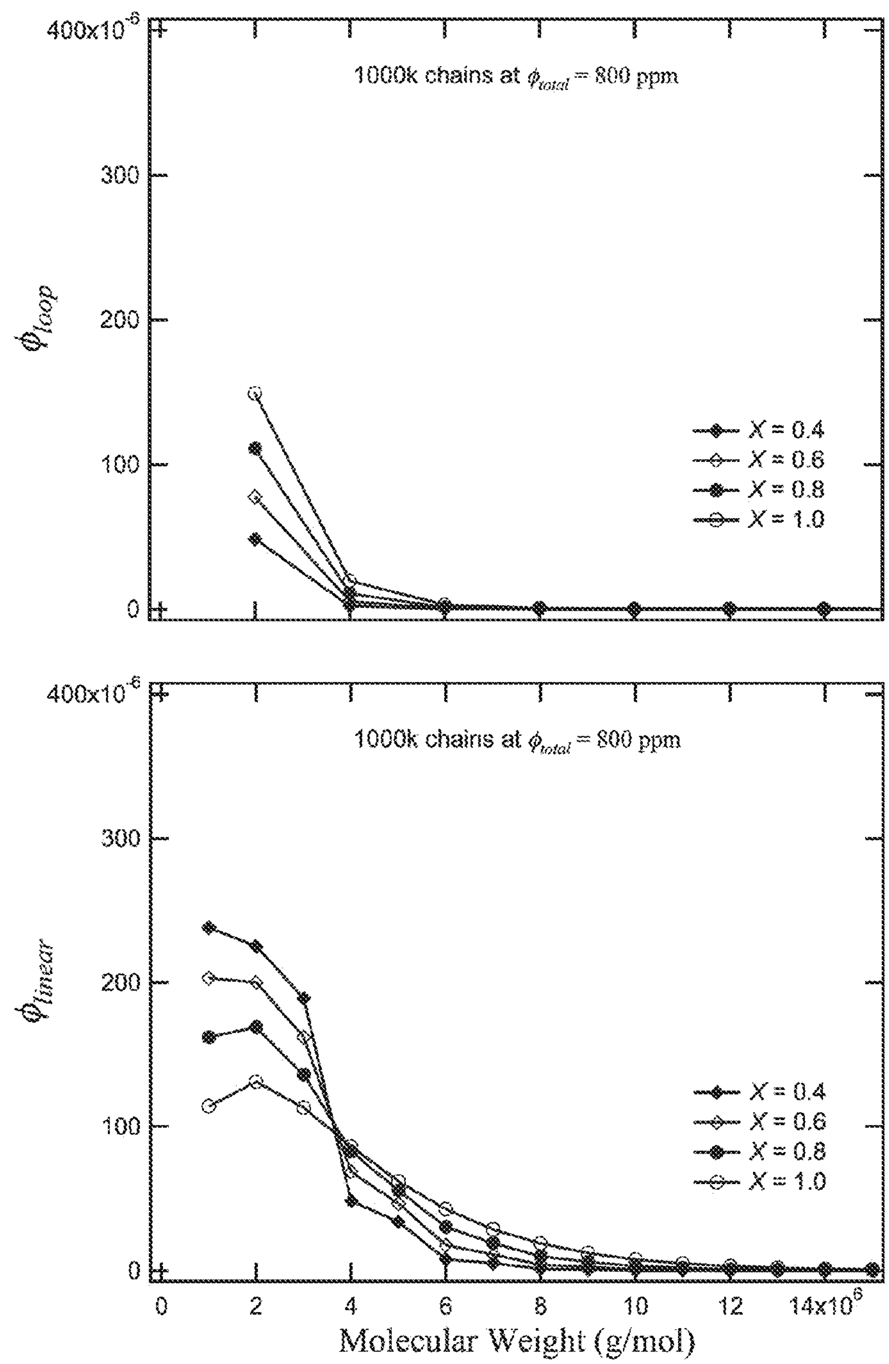
FIG. 11 provides data plots for model predictions in the presence of end-capped chains, when $\epsilon kT=16kT$.
Figure 12:
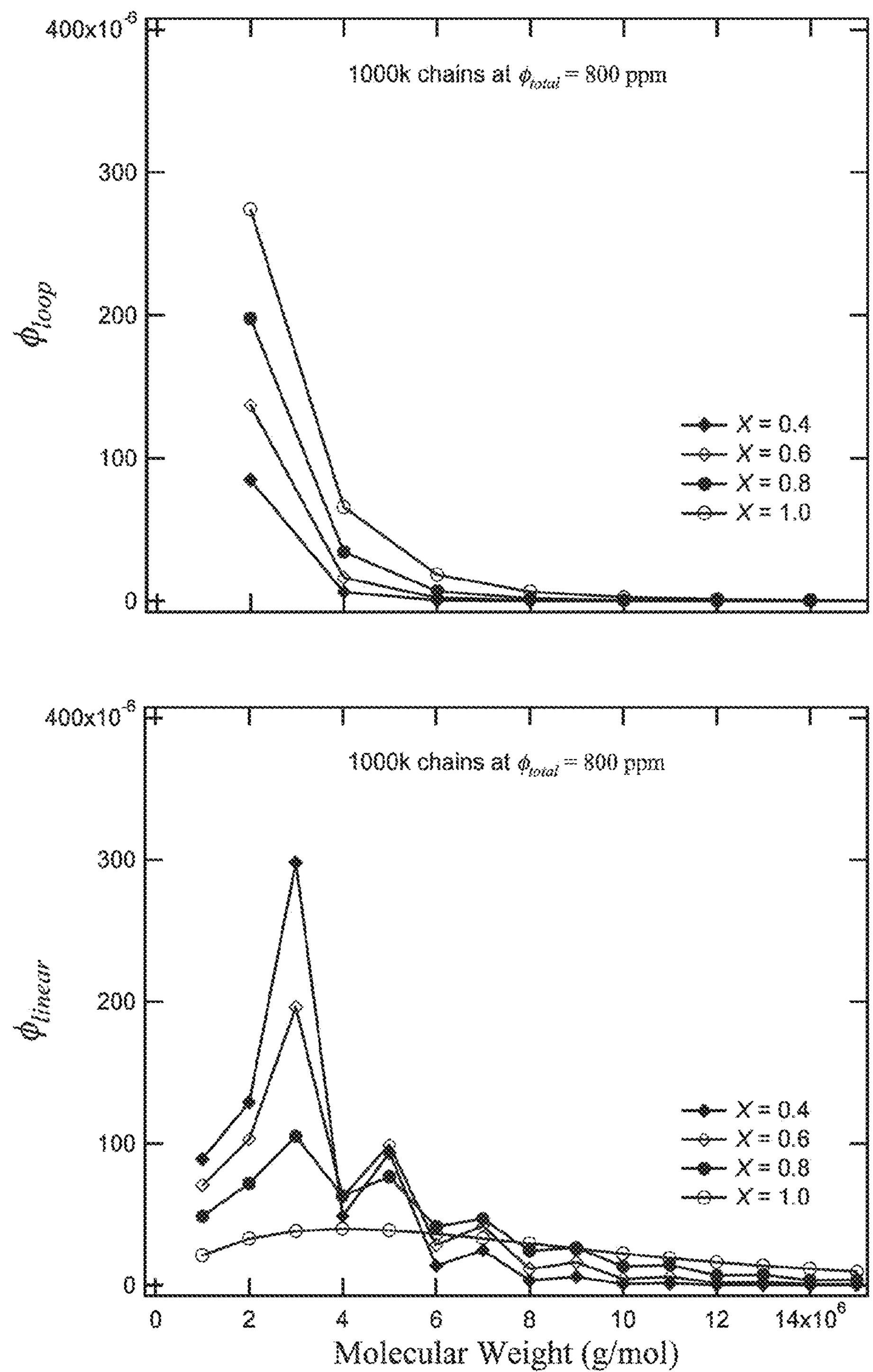
FIG. 12 provides data plots for model predictions in the presence of end-capped chains, when $\epsilon kT=18kT$.
Figure 13:
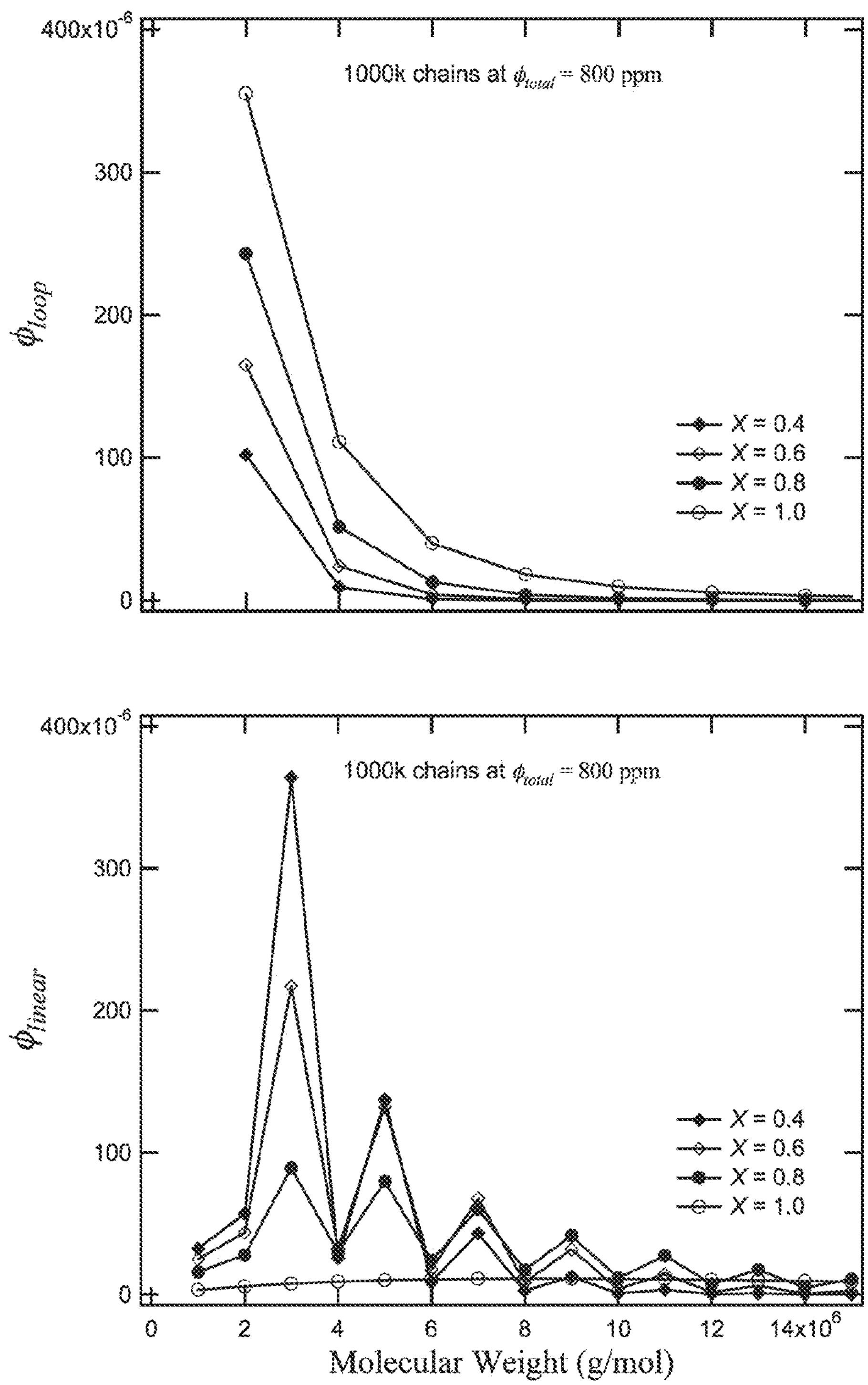
FIG. 13 provides data plots for model predictions in the presence of end-capped chains, when $\epsilon kT=20kT$.
Figure 14:
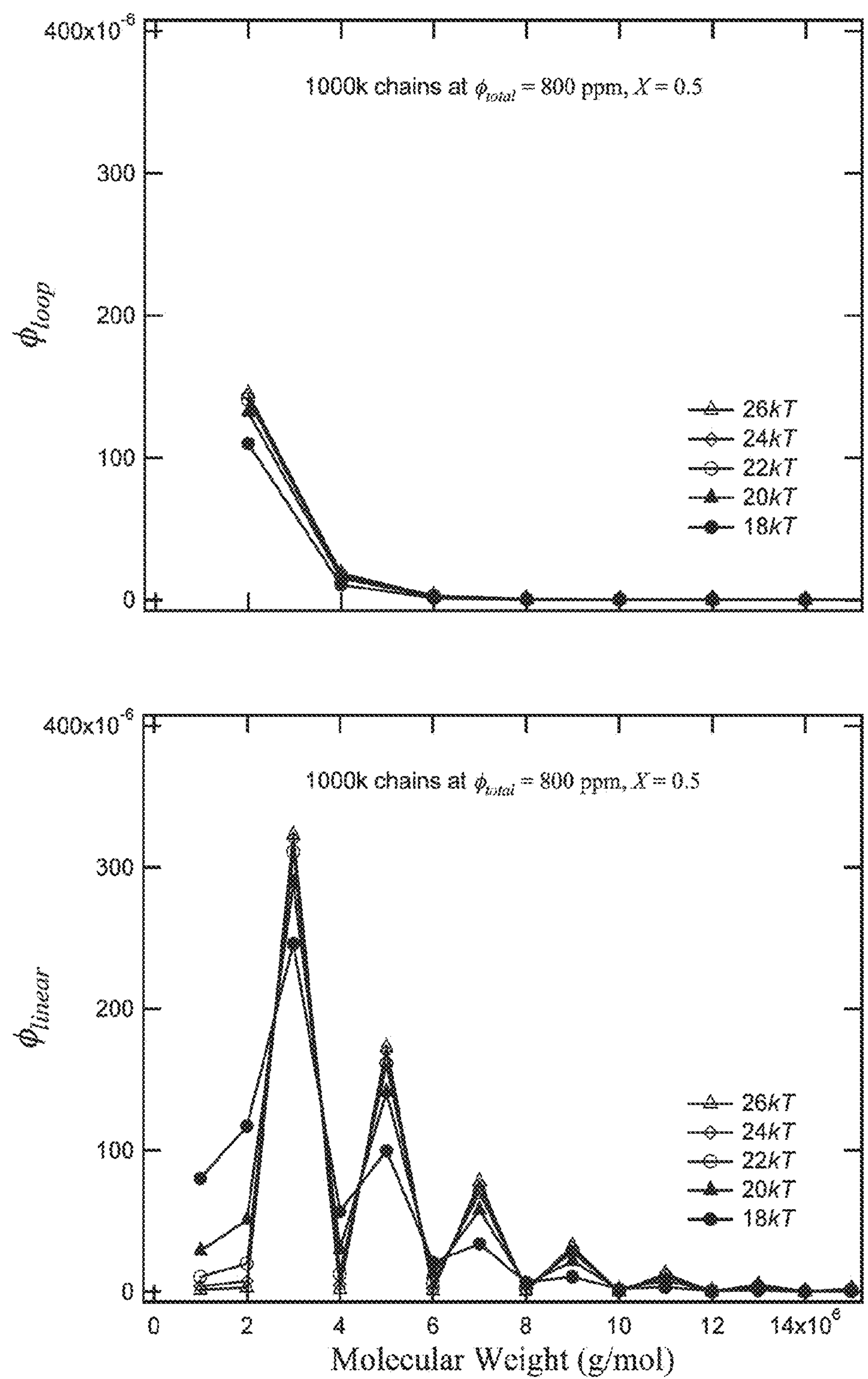
FIG. 14 provides data plots for the limiting equilibrium distribution (as $\epsilon\rightarrow\infty$) obtained in the presence of end-capping A---- polymer chains.

Finally, the effect of the energy of association on the equilibrium distributions is very pronounced (the columns of FIGS. 8 and 9 are in ascending order by association energy). First, higher values of $\epsilon$ strongly increase the population of loops of all sizes, i.e., increasing $\epsilon$ increases the relative fraction of loops compared to linear aggregates. Second, increasing $\epsilon$ greatly broadens the distribution of $\phi_{linear}$ vs. MW, decreasing the magnitude of the peak in the distribution. At values of $\epsilon\leq14$, aggregates are few and the dominant components are the telechelic building block themselves. At values of $\epsilon\geq20$, the dominant components are cycles of low MW, but the distribution of linear supramolecules is nearly flat, meaning that very large aggregates have a significant cumulative volume fraction at equilibrium. Intermediate values of the energy of association, corresponding to $16\leq\epsilon\leq18$, provide a balance of interactions strong enough to drive formation of large superchains and weak enough to accommodate a significant population with unpaired ends (i.e., linear superchains).

Case 2: Mixtures of A----A, B----B, and A---- Chains

Important changes in the partitioning of the polymer occur as end-capping A---- chains are added to solutions of A----A and B----B telechelics. A schematic of possible endcaps is provided in FIG. 10. At the lowest level of complexity, again, solutions of polymer additives of equal molecular weight ($MW_A=MW_B=MW_{cap}=MW_p$) are assumed. Solution compositions that maintain equal number densities of A and B endgroups, i.e., such that $\phi_{captotal}=2(\phi_{Btotal}-\phi_{Atotal})$ are considered. Therefore, the total polymer fraction of A---- end-capping chains, $\phi_{captotal}$, must be in the range from 0 to ⅔. Define $X=\phi_{Atotal}/\phi_{Btotal}$ as the ratio of telechelics A----A to telechelics B----B; that ratio decreases from 1 to 0 as the fraction of A---- increases from 0 to ⅔.

Results obtained for solutions of $MW_p=10^6$ g/mol at total volume fraction $\phi_{Atotal}+\phi_{Btotal}+\phi_{captotal}=800$ ppm (FIGS. 11 to 14) confirm that introducing end-caps favors the formation of linear species. At fixed $\epsilon$, $MW_p$, and $\phi_{total}$, the fraction of polymer involved in cycles decreases with increasing volume fraction of A---- end-caps, as expected (see top row of FIGS. 11 to 14). This is true at all values of $\epsilon$ and occurs simply because the presence of A---- components decreases the fraction of linear chains that can form loops. Note that the increase in the concentration of linear species upon addition of A---- (offsetting the decrease in $\phi_{loop}$) heavily favors short, rather than long aggregates: in fact, the population of very long linear superchains is reduced by adding end-caps (decreasing X), and this was also true at all values of $\epsilon$ (most visible in bottom row of FIGS. 11 and 12). In other words, increasing the volume fraction $\phi_{captotal}$ of end-capping chains causes a narrowing of the distribution of linear aggregates, meaning that fraction of polymer is involved in smaller linear supramolecules.

A striking qualitative difference between the binary (A----A+B----B) and the ternary systems is in the behavior as $\epsilon\rightarrow\infty$. In the absence of end-capping A----, the ratio of linear to cyclic supramolecules vanishes as $\epsilon\rightarrow\infty$ (FIG. 9). As the free energy penalty for leaving unpaired stickers diverges, no linear chains can survive in the absence of end-caps. When end-caps are present, one is free to increase e without extinction of linear species; instead as $\epsilon\rightarrow\infty$ a limiting distribution is achieved (FIG. 14) in which doubly end-capped linear species and cyclic species equilibrate in a manner that can be quantitatively controlled by the choice of the relative number of A---- single chains.

Example 3

Modeling Mist Control Additives

In this example, a set of parameter values are provided that can be incorporated into the model set forth in Examples 1 and 2 for which the equilibrium distribution of the polymer components is suitable for mist-suppression applications. The model can be used to determine whether or not the efficacy of ultra-long chains and the resistance to shear degradation of associative polymers can be combined, and, it will be shown that the present model may be used to guide the selection of chain lengths, association strengths, and mixture compositions that hold the greatest promise.

Chao and coworkers reported that polyisobutylene chains of molecular weight ~$5\times10^6$ g/mol were satisfactory mist-suppressing agents at concentrations as low as 50 ppm in kerosene. (See, e.g., Chao, K. K., et al., *AICHE Journal* 1984, 30, (1), 111-120, the disclosure of which is incorporated herein by reference.) Considering that cyclic polymer chains are expected only to be as effective as linear chains of half their size, the cumulative amount of linear species of $MW\geq5\times10^6$ g/mol and cycles of $MW\geq10\times10^6$ g/mol should be 50 ppm or more. Given that aviation fuel is continuously circulated on the aircraft as a heat transfer fluid, the kinetics of equilibration may play a role, i.e., in practice long linear aggregates may not achieve their equilibrium distribution (as will be discussed below). If so, polymer designs and mixture compositions that maximize the equilibrium fraction of polymer involved in linear supramolecular aggregates in the $5\text{-}10\times10^6$ g/mol range may lead to maximal mist suppression in practice.

Parameter Space

By restricting the level of complexity (choosing the A----A, B----B, and A---- building blocks to be of the same molecular weight $MW_p$, and by requiring that A and B endgroups have equal number densities in solution), the parameter space is reduced to 4 dimensions. Within the parameter space $\{MW_p, \epsilon, \phi_{total}, X\}$, the equilibrium partitioning of the polymer can be optimized for mist-control applications given the constraints of the problem. Here the bounds that are imposed on $MW_p$ and $\phi_{total}$ can be considered in the context of fuel additives.

First, the highest possible values of $MW_p$ should be used, since at fixed $\epsilon$ and $\phi_{total}$ the total fraction of polymer trapped in loops decreases monotonically with increasing $MW_p$. In reality the upper-bound of $MW_p$ is limited by mechanical degradation of the polymer. Unintentional chain scission of our telechelics would result in an excess of end-capping species that would greatly reduce the size of supramolecular chains that form. Literature on shear degradation shows that flexible linear chains of less than a few million g/mol resist degradation associated with flow through pumps and turbulent pipeline flow. Therefore, the limit $MW_p=10^6$ g/mol was imposed as our upper bound and compared results with $MW_p=0.5\times10^6$ g/mol in order to quantitate sensitivity to changes in $MW_p$.

Next, implementation of a polymer-based mist-control technology is not possible unless changes in shear viscosity of the fuel due to polymer addition are very small. Here the upper bound in total volume fraction of polymer is chosen to be one-fourth of the overlap concentration of the A----A and B----B, and A---- building blocks, recognizing that supramolecular chains formed by physical associations may reach or exceed their overlap concentration. So long as the very long supramolecules remain below their particular c*, the shear viscosity of the solution is expected to remain within permissible bounds. For the two chain lengths selected above, this constraint imposes a maximum polymer volume fraction of 800 ppm for $MW_p=10^6$ g/mol and 1400 ppm for $MW_p=5\times10^5$ g/mol. To quantify the improvements in mist control arising from increases in concentration, results for $10^6$ g/mol chains at both 800 and 1400 ppm were compared.

With the above choices for $MW_p$ and $\phi_{total}$, the problem may be reduced to two dimensions, $\epsilon$ and X, which were examined over their physically relevant ranges.

Implication for Mist-Control Applications

The criterion for optimal results with regard to mist-suppressing applications corresponds to maximizing the equilibrium fraction of polymer involved in linear supramolecular aggregates in the $5\text{-}10\times10^6$ g/mol range. Two key features of the distributions that satisfy this objectives are:

(i) favorable partitioning of the polymer into linear rather than cyclic aggregates, and (ii) a concentration vs. molecular weight curve for linear aggregates that is narrowly distributed and centered around $\sim5\times10^6$ g/mol.

According to the above criteria, model results show that partitioning of the polymer into linear superchains is favored at higher values of $MW_p$ and $\phi_{total}$, as expected, but that ~2-fold changes in $MW_p$ or $\phi_{total}$ about the $\sim\{10^6$ g/mol, 800 ppm$\}$ upper-boundary determined by total the problem constraints yield only small changes in the overall shapes of the $\phi_{linear}$, $\phi_{loop}$ distributions (compare first and second rows, and first and third rows at fixed $\epsilon$ in FIGS. 8 and 9). Effects of the energy of interaction were much more pronounced. For example, a≤15% change in $\epsilon$ from 14 to 16 yielded a dramatic change in the shape of the size distribution of aggregates for all values of $\{MW_p, \phi_{total}\}$ (FIG. 8).

The strong dependence of the size distribution of linear and cyclic aggregates on energy of interactions has important implications for mist-control applications. For mixtures of A----A and B----B molecules, model predictions indicate that "good" results are only achieved in a narrow range of association energy, $16\leq\epsilon\leq18$. The following two complications immediately arise:

- The preparation of telechelic chains of such length ($\sim10^6$ g/mol) terminated with endgroups that all bind with a precise target strength of interaction of such magnitude (>16kT) poses a tremendous synthetic challenge (see, full discussion below); and
- The strength of physical associations is strongly temperature dependent and the operating temperature range of interest for aviation fuel is very broad (−50 to +60° C.), so it is doubtful that any system could be designed to maintain the binding energy of the polymer endblocks within such a narrow range.

Addition of A---- end-capping chains to A----A+B----B mixtures solves the above problem, at least under equilibrium conditions. For instance, model results for $10^6$ g/mol chains at $\phi_{total}$=800 ppm and X=0.5 (FIG. 14) show that for any value of $\epsilon\geq20$, the equilibrium volume fraction of linear superchains of $5\times10^6$ g/mol is greater than 100 ppm and that of $7\times10^6$ g/mol superchains is greater than 50 ppm. This means that the mist-suppression effectiveness of such a polymer solution under equilibrium conditions will be robust with respect to fluctuation in $\epsilon$ due to temperature variations or to variations in molecular structure of the endgroups. The model, therefore, indicates that it is possible to create polymers whose equilibrium distribution of aggregates provides the requisite concentration of very long supramolecular chains over a wide range of temperature. At this point, it is necessary to inquire whether it is reasonable to expect that equilibrium partitioning of the polymer will be found under conditions of practical import.

Time to Reach the Equilibrium Distribution

Earlier, values of $\{\epsilon, X\}$ were explored that allowed for the optimization of the equilibrium distribution of polymer components. In doing so, it is assumed that under conditions of practical importance, equilibrium is restored as fast it is disturbed. To determine how long it takes to reach the equilibrium partitioning of the polymer into aggregates of all sizes it is necessary to start by considering the lifetime of a bond. The relaxation time $\tau_0\sim\eta b^3/kT$ of a monomer in solution of shear viscosity ~1 mPa·s is on the order of $10^{-10}$ sec, so the lifetime of a donor-acceptor physical bond $\tau_b\sim\tau_0 \exp(\epsilon)$ is on the order of 0.001-10 sec for $\epsilon$=17-25. Therefore, even if it is assumed that equilibrium could be reached with a mere $10^3$ bond breaking and bond forming events, for endgroups associating with energy 20-25kT, that time is on the order of $1\text{-}10^4$ s. Consider now that processes such as recirculation of the fuel within an aircraft are expected to breakup polymer aggregates down to individual components at intervals of a few minutes during, for example, passage through pumps. Experimentation shows that in solutions of A----A plus B----B plus A----, polymer chains reassociate into large superchains sufficiently rapidly to be used as mist-suppressing agents for aviation fuel.

From Telechelics to Heterotelechelics

Using the model it was possible to determine that ternary mixtures of A----A, B----B, and A---- chains in dilute solutions deserve the effort required to synthesize the polymer. Unfortunately, they suffer to some extent from the same problems as mixtures of A----A and B----B chains only (whose binary mixtures do not appear to be viable candidates for mist-suppressing applications):

(i) To provide 50 ppm of superchains $>5\times10^6$ g/mol, the overall polymer concentration must be several hundred ppm because a lot of polymer is "lost" in useless small cycles and small linear aggregates, and (ii) The reassembly of superchains takes time, and the longer the superchain the longer it takes for its population to build up to its equilibrium value.

The above insight suggests that a better alternative involves the design of a polymer system for which loops are prohibited and associations would result in the systematic formation of well-defined linear chains. An example of such a design is shown in FIG. 3. It involves two sets of specific interactions, such that A endgroups interact only with B endgroups, and C endgroups likewise only with D endgroups. The molecules in FIG. 3 are designed such that for a stoichiometric blend of the building blocks and at high enough binding affinity of the A+B and C+D associations, nearly all the polymer chains should assemble into pentamers (in 4 bond-forming events only) even at arbitrarily low polymer volume fraction $\phi_{total}$. As a result, satisfactory mist suppression could be achieved with <100 ppm of A----A, B----C, and D---- chains of size $MW=10^6$ g/mol.

Nature of the Endgroups

Now, it is important to model what chemical moieties might be used at the chain ends to generate association energies in the 17-25kT range. For this exercise, let A and B refer to the small molecules corresponding to these endgroups. In a first inquiry, it is necessary to determine what equilibrium constant of association $K_{ass}$ the above association energies correspond to. For the association reaction of the free-endgroups A+B→AB, our model predictions are:

$$\left(\frac{\phi_{AB}}{M_{AB}}\right)=\left(\frac{\phi_A}{M_A}\right)\left(\frac{\phi_B}{M_B}\right)\exp\left[-\frac{1}{kT}(\mu_{AB}^0-\mu_A^0-\mu_B^0)\right]=\exp(\varepsilon). \quad \text{(EQ. 32)}$$

For small molecules in dilute solution, this expression is consistent with the equilibrium condition for ideal solutions (Raoult's law), $x_{AB}/x_Ax_B=\exp[-(\mu_{AB}{}^0-\mu_A{}^0-\mu_B{}^0)]$, where x is mole fraction. It follows from EQ. 32 that $K_{ass}=C_{AB}/C_AC_B=\nu_s\exp(\epsilon)$, where C is molar concentration and $\nu_s$ is the molar volume of the solvent. Thus, achieving binding energies of the endgroups in the range of $\epsilon$=17-25 corresponds to association constants $K_{ass}$, on the order of $10^7$ to $10^{10}$ $M^{-1}$.

Figure 15:
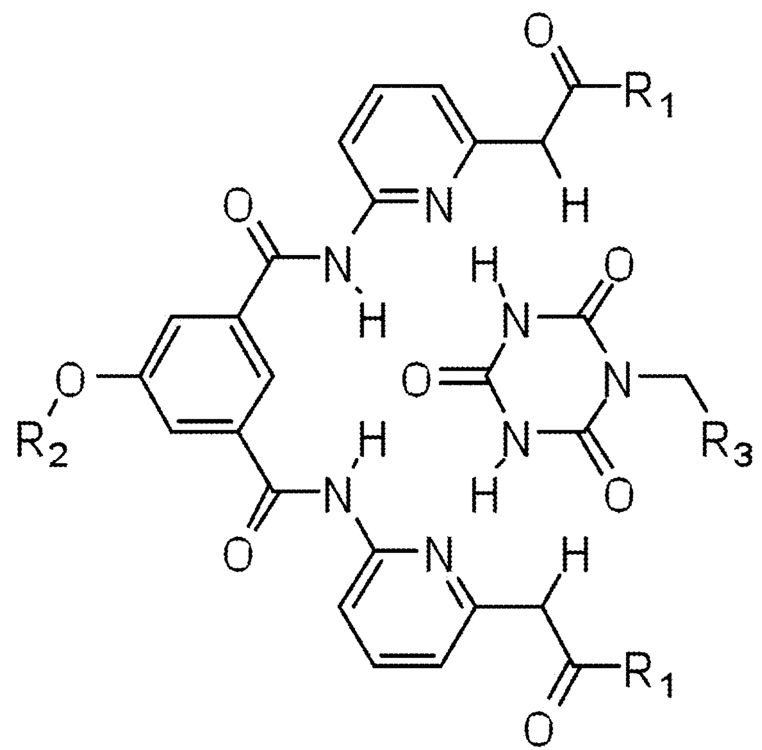
FIG. 15 provides a molecular diagram of sextuple hydrogen-bonding motifs derived from nucleobase structures, of binding constants ~$10^6$ $M^{-1}$ in organic solvents of low polarity.

Although interacting chemical structures of binding constants up to $10^6$ $M^{-1}$ are known (FIG. 15, and described in Binder, W. H. et al., *Macromolecules* 2004, 37, (5), 1749-1759; and Kolomiets, E. et al., *Macromolecules* 2006, 39, (3), 1173-1181.), the disclosures of which are incorporated herein by reference). However, in the past the synthetic challenge of preparing telechelic polymer chains of size $10^6$ g/mol with well-defined endgroups of binding constants ~$10^7$ to $10^{10}$ $M^{-1}$ has proven too difficult. In addition to the challenge of finding a suitable donor-acceptor pair, synthesis of telechelics becomes increasingly more difficult with increasing size. Furthermore, the endgroups (which would be present at <ppb levels in dilute polymer solutions) can be poisoned by even minute amounts of acids, bases, metals etc., present in the solvent, thereby rendering the polymer ineffective.

The current invention addresses these synthetic problems by using short polymer endblocks featuring an arbitrary number of donor-acceptor type functional groups. For example, synthesis of $10^6$ g/mol polymer chains endcapped with 1,2-PB endblocks of a few thousands g/mol enables the preparation of associating polymer of tunable binding affinities by post-polymerization functionalization of the 1,2-PB. This strategy provides more flexibility in the choice of binding energy and also facilitates fast and effective optimization of material properties via rapid adjustments in the number and the identity of the functional side-groups.

Example 3

Rheological Study

Figure 16:
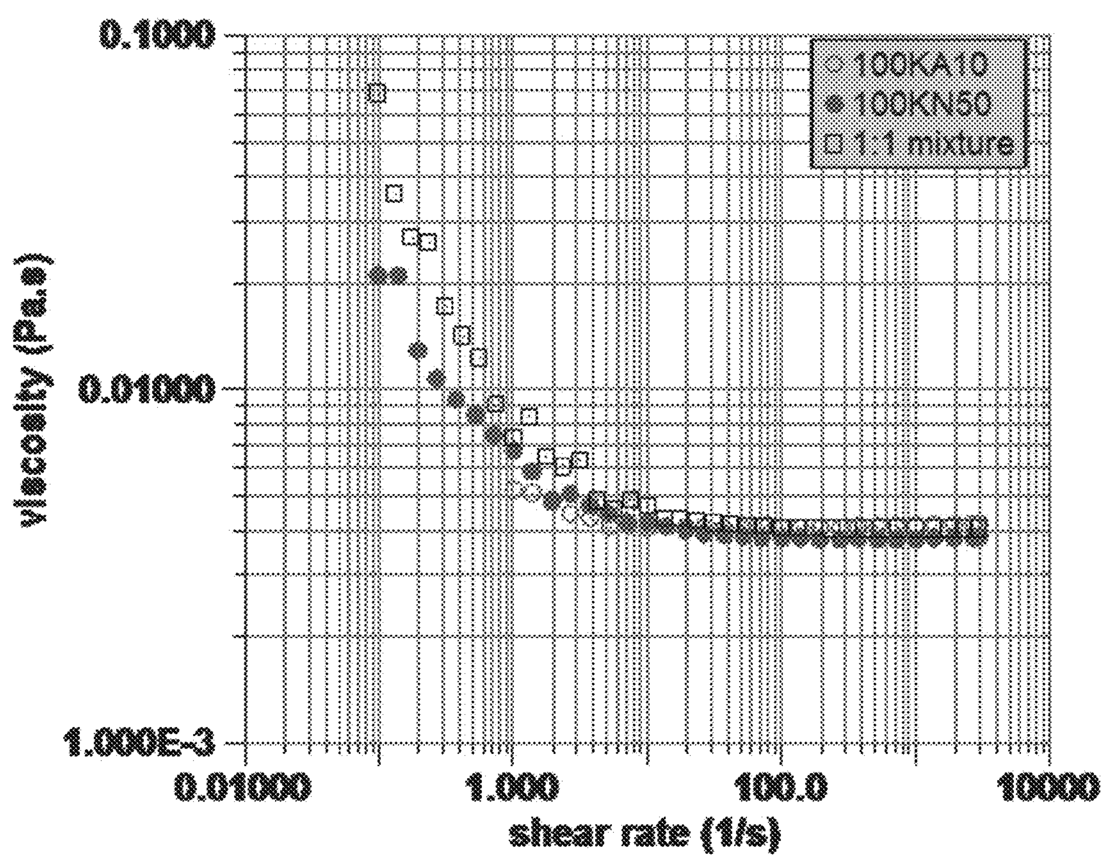
FIG. 16 provides a data plot of the relationship between shear viscosity and shear rate in exemplary mist control materials.

The solution rheology of a pair of proton-donating/accepting end-to-end associating polymers (100KA10 and 100KN50) in a widely used aviation fuel Jet-A was studied at 40° C. under steady-state shear field. 100KA10 denotes a tri-block copolymer poly(acrylic acid)-block-poly(cyclooctene)-block-poly(acrylic acid) (average molecular weight=$10^5$ g mole$^{-1}$), in which the total number of acrylic acid units is 10; likewise, 100KN50 denotes a tri-block copolymer poly(2-(dimethylamino)ethyl methacrylate)-block-poly(cyclooctene)-block-poly(2-(dimethylamino) ethyl methacrylate) (average molecular weight=$10^5$ g mole$^{-1}$), in which the total number of 2-(dimethylamino) ethyl methacrylate units is 50. Both polymers were prepared by the combination of ring-open metathesis polymerization (ROMP) of cyclooctene and atom-transfer radical polymerization of acrylate monomers. Solutions of 100KA10 and 100KN50 in Jet-A were prepared respectively at a weight concentration of 1.4 wt %, which is close to the overlap concentration. A 1:1 mixture of the two solutions was then prepared to study the effect of complementary end-to-end association. FIG. 16 shows a plot of the relationship between shear viscosity and shear rate for all the three solutions. At low shear rate regime, the solution of complementary pair exhibits a significantly higher shear viscosity than solutions of the two components at the same concentration. It is well known that the shear viscosity of polymer solutions is proportional to the half-power of apparent molecular weight of polymer chains. The observed increase in viscosity reflects the formation of long-chain supramolecular aggregates due to end-to-end complementary association. At high shear regime, the difference in viscosity between the blend and components vanishes. Although not to be bound by theory, it is possible that this is because the shear force outstrips the strength of end-to-end complementary association.

Example 4

Preparation of Poly (Acrylic Acid)-Block-Poly (Cyclooctene)-Block-Poly (Acrylic Acid) Triblock Proton-Donating Associating Polymer (100KA10)

A macro initiator for ATRP of tert-butyl acrylate (the precursor of associating group acrylic acid) was prepared as follows. A 100 ml round-bottom Schlenk reactor equipped with a magnetic stir bar was charged with 2.0 g (0.0172 moles) of cis-cyclooctene, 0.247 g (0.00069 moles) of cis-2-butene-1,4-diyl bis(2-bromopropanoate), and 17 ml of anhydrous dichloromethane. The content was degassed by freeze-pump-thaw cycles. The polymerization was initiated by the addition of a solution of 2.93 mg (0.0034 mmoles) second-generation Grubbs catalyst in 1.0 ml of degassed anhydrous dichloromethane. After 20 hours at 40° C., the resulting solution was precipitated drop-wise into stirring methanol (200 ml) at 0° C. The resulting polymer was then redissolved in 10 ml of tetrahydrofuran (THF) and reprecipitated into cold methanol twice. The isolated polymer was dried in vacuum to remove any traces of solvent. Proton NMR (300 MHz, $CDCl_3$, room temperature) showed signals of ATRP-capable end groups 2-bromopropanoate at δ 4.36 (quartet, assigned to —$CO_2CH$—Br)) and δ 4.65 (multiplet, assigned to —$CH_2$—$CO_2$). Gel permeation chromatography (THF, 30° C.) indicated that the polymer has a number-average molecular weight of 12800 g mole$^{-1}$ and a PDI of 1.87.

The aforementioned macro initiator was used to initiate ATRP of tert-butyl acrylate, and the resulting triblock copolymer was then used as macro chain transfer agent in the preparation of 100KA10, which is described in detail below. A 10 ml tubular Schlenk reaction equipped with a magnetic stir bar was charged with 0.25 g (0.0195 mmoles) of the aforementioned macro initiator, 0.20 g (1.56 mmoles) of tert-butyl acrylate, 7 mg (0.039 mmoles) of chelating agent pentamethyldiethylenetriamine (PMDETA), and 1 ml of anhydrous THF. The mixture was degassed by three freeze-pump-thaw cycles. 3.4 mg (0.0195 mmoles) ATRP catalyst copper(I) bromide (CuBr) was loaded into the reactor under protection of argon flow when the mixture remained frozen.

The reaction mass was then brought to room temperature and stirred for 20 minutes to allow CuBr to complex with PMDETA and dissolve into the liquid phase. The reactor was placed in an oil bath at 66° C. to initiate ATRP of tert-butyl acrylate. After 5 hours, the reaction was terminated by exposing the reaction mass to air and dilution with 10 ml of THF. The resulting solution was passed through an active alumina (basic type) plug to remove metal catalyst. The filtrate was dried under vacuum at 40° C. overnight to remove unreacted tert-butyl acrylate monomer. Proton NMR (300 MHz, $CDCl_3$, room temperature) showed signals of poly (tert-butyl acrylate) block at δ 2.22 (broad peak, assigned to —$CHCO_2C$) and δ 1.42 (singlet, assigned to tert-butyl group). GPC showed that the polymer has a number-average molecular weight of 14100 g $mole^{-1}$ and a PDI of 1.85. The average number of tert-butyl acrylate units per chain was estimated to be 10 based on the difference in molecular weight between the macro initiator and the resulting triblock.

To prepare the final polymer, the triblock above was used as macro chain transfer agent in ROMP of cis-cyclooctene. A 100 ml round-bottom Schlenk reactor equipped with a magnetic stir bar was charged with 1.23 g (0.0106 moles) of cis-cyclooctene, 0.109 g (0.0106 mmoles) of the above triblock, and 11 ml of anhydrous dichloromethane. The content was degassed by three freeze-pump-thaw cycles. The polymerization was initiated by the addition of a solution of 0.94 mg (0.0011 mmoles) second-generation Grubbs catalyst in 1.0 ml of degassed anhydrous dichloromethane. After 20 hours at 40° C., the resulting solution was precipitated drop-wise into stirring methanol (200 ml) at 0° C. The resulting polymer was then redissolved in 10 ml of tetrahydrofuran (THF) and reprecipitated into cold methanol twice. The isolated polymer was dried in vacuum to remove any traces of solvent. Proton NMR (300 MHz, $CDCl_3$, room temperature) showed signals of poly (tert-butyl acrylate) block at δ 1.42 (singlet, assigned to tert-butyl group). Gel permeation chromatography (THF, 30° C.) indicated that the polymer has a weight-average molecular weight of 104000 g $mole^{-1}$ and a PDI of 1.73. In order to remove tert-butyl groups, 0.35 g of the resulting polymer was mixed with 0.5 ml of trifluoroacetic acid, 10 ml of dichloromethane, and trace butylhydroxytoluene (BHT) in a 50 ml round-bottom flask and stirred at room temperature overnight. The polymer was isolated by three times of reprecipitation in cold methanol. Proton NMR (300 MHz, $CDCl_3$, room temperature) showed that the signal of tert-butyl groups disappeared after deprotection. The proton-donating polymer 100KA10 was thus obtained. Solubility test of 100KA10 in aviation fuel Jet-A at temperatures ranging from 25 to 50° C. showed that clear solutions could be achieved at concentrations as high as 1.5 wt %.

Example 5

Preparation of Poly(2-(dimethylamino)ethyl methacrylate)-block-Poly (cyclooctene)-block-Poly(2-(dimethylamino)ethyl methacrylate) triblock proton-accepting associating polymer, (100KN50)

The macro-CTA approach for 100KA10 was also utilized to prepare 100KN50. Same macro ATRP initiator ($M_n$=12800, PDI=1.87) was used to initiate ATRP of 2-(dimethylamino)ethyl methacrylate for preparing macro CTA bearing proton-accepting groups. A 10 ml tubular Schlenk reaction equipped with a magnetic stir bar was charged with 0.20 g (0.0156 mmoles) of the said macro initiator, 0.20 g (1.25 mmoles) of 2-(dimethylamino)ethyl methacrylate, 7 mg (0.0312 mmoles) of chelating agent 1,1,4,7,10,10-hexamethyltriethylenetetramine (HMTETA), and 1 ml of anhydrous THF. The mixture was degassed by three freeze-pump-thaw cycles. 3.4 mg (0.0195 mmoles) ATRP catalyst copper(I) bromide (CuBr) and 0.7 mg (0.062 mmoles) of copper(II) bromide ($CuBr_2$) were loaded into the reactor under protection of argon flow when the mixture remained frozen. The reactor mass was then brought to room temperature and stirred for 20 minutes to allow CuBr/$CuBr_2$ to complex with HMTETA and then dissolve into the liquid phase. The reactor was placed in an oil bath at 40° C. to initiate ATRP of 2-(dimethylamino)ethyl methacrylate. After 22 hours, the reaction was terminated by exposing the reaction mass to air and dilution with 10 ml of THF. The resulting solution was passed through an active alumina (basic type) plug to remove metal catalyst. The filtrate was dried under vacuum at 40° C. overnight to remove unreacted 2-(dimethylamino)ethyl methacrylate monomer. Proton NMR (300 MHz, $CDCl_3$, room temperature) showed signals of poly(2-(dimethylamino)ethyl methacrylate) blocks at δ 2.27 (singlet, assigned to —$N(CH_3)_2$), δ 2.55 (singlet, assigned to —$CH_2$—N), and δ 4.05 (singlet, assigned to —$CO_2$—$CH_2$). Average number of 2-(dimethylamino)ethyl methacrylate units per chain was estimated to be 50 based on proton NMR results.

Preparation of proton-accepting triblock copolymer is described as follows. A 100 ml round-bottom Schlenk reactor equipped with a magnetic stir bar was charged with 2.91 g (0.025 moles) of cis-cyclooctene, 0.16 g (0.025 mmoles) of the above macro CTA, and 25 ml of anhydrous dichloromethane. The content was degassed by three freeze-pump-thaw cycle. The polymerization was initiated by the addition of a solution of 1.3 mg (0.0015 mmoles) second-generation Grubbs catalyst in 1.0 ml of degassed anhydrous dichloromethane. After 20 hours at 40° C., the resulting solution was precipitated drop-wise into stirring methanol (200 ml) at 0° C. The resulting polymer was then redissolved in 10 ml of tetrahydrofuran (THF) and reprecipitated into cold methanol twice. The isolated polymer was dried in vacuum to remove any traces of solvent. Signals of poly (2-(dimethylamino)ethyl methacrylate) block were all present in proton NMR of the resulting polymer. Gel permeation chromatography (THF, 30° C.) indicated that the polymer has a weight-average molecular weight of 102000 g $mole^{-1}$ and a PDI of 1.54. The proton-donating polymer 100KN50 was thus obtained. Solubility test of 100KN50 in aviation fuel Jet-A at temperatures ranging from 25 to 50° C. showed that clear solutions could be achieved at concentrations as high as 1.5 wt %.

CONCLUSION

Mist-Controlled Kerosene is well-established as a very promising technology for improving the safety and security of our aviation systems, but nonviable to date for lack of a proper material. The current invention provides a molecular design/architecture which overcomes limitations of previous materials and which from the onset addresses key issues such as flow degradation and aggregation dynamics. Accordingly, in accordance with the current invention mist control agents can be produced that improve the fire safety of aviation fuel and other substances, by reduce misting of the fuel, thereby delaying and reducing the intensity of fire immediately following the crash of a jet aircraft. (See, e.g., Fuel Safety Research", Workshop Proceedings, FAA, 29 October-1 November, 1985, Alexandria, Va.; and "Research on Antimisting Fuel for Suppression of Post-Crash Fires," Virendra Sarohia, et al., AIAA paper 86-0573, the disclosures of which are incorporated herein by reference.) The proposed polymer additive may also serve to reduce the cost of transporting fuel and increase the throughput of fuel transported in existing pipes (e.g. reducing plane turnaround time owing to faster fueling.) This additional benefit is due to the well-established decrease in the frictional losses under turbulent flow that results from the addition of part-per-million (ppm) levels of long chain polymer to a fuel. (See, e.g., Lumley J. L., *Annu. Rev. Fluid Mech.* 1, 367-384 (1969); and Gyr A., H. W. Bewersdorff, Drag Reduction of Turbulent Flows by Additives; Kluwer (1995), the disclosures of which are incorporated herein by reference.)

Doctrine of Equivalents

Those skilled in the art will appreciate that the foregoing examples and descriptions of various preferred embodiments of the present invention are merely illustrative of the invention as a whole, and that variations in the steps and various components of the present invention may be made within the spirit and scope of the invention. For example, it will be clear to one skilled in the art that additional components, alternative configurations or other synthesis schemes would not affect the improved properties of the mist control agents of the current invention, nor render the mist control agents unsuitable for their intended purpose. Accordingly, the present invention is not limited to the specific embodiments described herein but, rather, is defined by the scope of the appended claims.

What is claimed is:

1. An associative mist control material, comprising a mixture of polymers having:

at least one non-associative chain having a weight average molar mass comprised between 100 to 1000 kg/mol, said non-associative chain being selected to confer solubility to the polymer in a particular medium such that the medium and the mist control material form a homogeneous single phase;

a plurality of associative groups wherein each associative group is separated from each other associative group by at least one non-associative chain;

wherein the associative groups are selected such that the polymer does not self-associate and wherein the associative groups of said polymers reversibly associate with an association strength less than that of a covalent bond thereby forming supramolecules such that the supramolecules reversibly dissociate without chemical degradation.

2. The mist control material of claim 1, wherein the mixture of polymers comprises at least two different complementary polymers each of said polymers comprising:

at least one non-associative chain, and a plurality of associative groups disposed at either end of each of said nonassociative chains; and wherein the associative groups do not self-associate, and wherein the associative groups of the at least two different complementary polymers reversibly associate with an association strength less than that of a covalent bond thereby forming supramolecules such that the supramolecules may dissociate without chemical degradation of the polymers.

3. The mist control material of claim 2, wherein the mixture comprises two complementary heterotelechelic linear polymers, and wherein the associative groups at each end of each of the complementary polymers are different such that each end of each of the first complementary polymer is designed to associate with only one end of the second complementary polymer.

4. The mist control material of claim 3, wherein the associative groups at a first end of both complementary polymers associate by an acid/base interaction, and wherein the associative groups at a second end of both complementary polymers associate by an electron donor/acceptor interaction.

5. The mist control material of claim 2, wherein the association strength of the complementary polymers is sufficiently strong to provide association of the polymers into supramolecules at temperatures up to 60° C.

6. The mist control material of claim 2, wherein the at least two different complementary polymers form a donor/acceptor pair.

7. The mist control material of claim 2, wherein the mixture comprises a first monotelechelic polymer, a second complementary heterotelechelic linear polymer, and a third telechelic polymer, and wherein the associative groups of the first polymer are complementary to only one end of the second heterotelechelic polymer, and the other end of the second heterotelechelic polymer is different and complementary to the associative groups of the third homotelechelic polymer such that the complementary polymers selectively associate thereby forming supramolecules that are linear pentamers.

8. The mist control material of claim 1, wherein the at least one non-associative chain is a homopolymer of a monomer or a copolymer of different monomers and the monomer or monomers are selected from the group of isoprene, butadiene, ethylene, propylene, butene, norbornene derivatives, cyclobutene, cyclopentene, cyclooctene, cyclooctadiene, and (trans, trans, cis)-1, 5,9-cyclododecatriene.

9. The mist control material of claim 1, wherein the at least one non- associative chain confers solubility in fuel over a wide temperature range from −40° C. to +60° C.

10. The mist control material of claim 9, wherein the solubility in fuel is conferred to the at least one non-associative chain by unsaturated hydrocarbon groups attached thereto.

11. The mist control material of claim 1, wherein the associative groups are selected from the group of hydrogen bond donor/acceptor pairs, charge transfer donor/acceptor pairs and ionic bond donor/acceptor pairs.

12. The mist control material of claim 11, wherein the associative groups include a carboxylic acid/tertiary amine acid/base pair.

13. The mist control material of claim 12, wherein the tertiary amine is selected from the group consisting of dialkylamino groups connected via a linker that includes methylene carbons adjacent to the amine and selected from (dimethylamino) alkyl groups, (diethylamino) alkyl groups and (methylethylamino) alkyl groups, and pyridyl groups.

14. The mist control material of claim 11, wherein the associative groups include a hydrogen bond pair selected from the group consisting of hydroxyphenyl/pyridyl pairs, and 2,4-Bis(propylamido)pyridine/Hydrouracil pair.

15. The mist control material of claim 11, wherein the associative groups include a charge transfer pair, and wherein the electron donor is selected from the group consisting of carbazole derivatives and N,N-dimethylanilino derivatives, and wherein the electron acceptor is selected from the group consisting of dinitrophenyl group, 3,6-dinitro-carbazolyl group, buckminsterfullerene ($C_{60}$), 4-bromo-1-naphthyl group, dansyl group, anthracene, pyrene, 2,3,5,6-tetrafluorophenyl group, and cyanophenyl group.

16. An associative mist control material comprising:

a mixture of polymers each having:

at least one non-associative chain, said non-associative chain being selected to confer solubility to the polymer in a particular medium such that the medium and the mist control material form a homogeneous single phase;

a plurality of associative groups disposed on at least one end of each of said non-associative chains, wherein the associative groups are selected such that the polymer does not self-associate; and wherein the associative groups of said polymers reversibly associate with an association strength less than that of a covalent bond thereby forming supramolecules;

wherein the associative groups are selected from the group of hydrogen bond donor/acceptor pairs, charge transfer donor/acceptor pairs and ionic bond donor/acceptor pairs; and wherein the associative groups include a hydrogen bond pair selected from the group consisting of hydroxyphenyl/pyridyl pairs, and 2,4-Bis(propylamido)pyridine/Hydrouracil pair.

17. An associative mist control material comprising:

a mixture of polymers each having:

at least one non-associative chain, said non-associative chain being selected to confer solubility to the polymer in a particular medium such that the medium and the mist control material form a homogeneous single phase;

a plurality of associative groups disposed on at least one end of each of said non-associative chains, wherein the associative groups are selected such that the polymer does not self-associate; and wherein the associative groups of said polymers reversibly associate with an association strength less than that of a covalent bond thereby forming supramolecules;

wherein the associative groups are selected from the group of hydrogen bond donor/acceptor pairs, charge transfer donor/acceptor pairs and ionic bond donor/acceptor pairs; and wherein the associative groups include a charge transfer pair, and wherein the electron donor is selected from the group consisting of carbazole derivatives and N,N-dimethylanilino derivatives, and wherein the electron acceptor is selected from the group consisting of dinitrophenyl group, 3,6-dinitro-carbazolyl group, buckminsterfullerene ($C_{60}$), 4-bromo-1-naphthyl group, dansyl group, anthracene, pyrene, 2,3,5,6-tetrafluorophenyl group, and cyanophenyl group.

* * * * *